(12) United States Patent
Jöngren et al.

(10) Patent No.: US 12,289,615 B2
(45) Date of Patent: Apr. 29, 2025

(54) METHODS AND APPARATUSES FOR PROVIDING TRANSMIT/RECEIVE RELATIVE RADIO ALIGNMENT VERIFICATION

(71) Applicant: Telefonaktiebolaget LM Ericsson (publ), Stockholm (SE)

(72) Inventors: George Jöngren, Sundbyberg (SE); Johan Furuskog, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 17/757,710

(22) PCT Filed: Dec. 14, 2020

(86) PCT No.: PCT/SE2020/051210
§ 371 (c)(1),
(2) Date: Jun. 17, 2022

(87) PCT Pub. No.: WO2021/126055
PCT Pub. Date: Jun. 24, 2021

(65) Prior Publication Data
US 2023/0036989 A1 Feb. 2, 2023

Related U.S. Application Data

(60) Provisional application No. 62/949,839, filed on Dec. 18, 2019.

(51) Int. Cl.
*H04L 12/00* (2006.01)
*H04L 5/00* (2006.01)
(Continued)

(52) U.S. Cl.
CPC .......... *H04W 16/28* (2013.01); *H04L 5/0048* (2013.01); *H04W 56/001* (2013.01)

(58) Field of Classification Search
CPC .. H04W 16/28; H04W 56/001; H04L 5/0048; H04B 7/04
(Continued)

(56) References Cited

U.S. PATENT DOCUMENTS

| | | |
|---|---|---|
| 2012/0243424 A1 | 9/2012 | Wang et al. |
| 2013/0029586 A1* | 1/2013 | Wang .................. H04L 27/2657 455/3.01 |
| 2018/0317186 A1* | 11/2018 | Fan ........................ H04L 5/0035 |

OTHER PUBLICATIONS

International Search Report and Written Opinion for Application No. PCT/SE2020/051210, Mar. 17, 2021, 12 pages.

(Continued)

*Primary Examiner* — Frantz Coby
(74) *Attorney, Agent, or Firm* — Sonoda & Kobayashi Intellectual Property Law; Sarvajit S. Patil

(57) ABSTRACT

Radio alignment of downlink and uplink channels between a wireless device and a multi-antenna base station. A method performed by a network node comprises obtaining downlink channel data, wherein the downlink channel data comprises: estimates of a plurality of downlink channels each associated with a downlink reference signal being received from one of the antennas at the wireless device, and time synchronization information associated with each of the downlink channels; obtaining uplink channel data, wherein the uplink channel data comprises: estimates of a plurality of uplink channels each associated with an uplink reference signal being received at one of the antennas from the wireless device, and time synchronization information associated with each of the uplink channels; comparing the downlink channel data and the uplink channel data to determine whether the downlink channel and uplink channel between the wireless device and the multi-antenna base station are aligned.

16 Claims, 26 Drawing Sheets

(51) Int. Cl.
 *H04W 16/28* (2009.01)
 *H04W 56/00* (2009.01)
(58) Field of Classification Search
 USPC .......................................................... 370/329
 See application file for complete search history.

(56) References Cited

OTHER PUBLICATIONS

Xiliang Luo et al., "Online Compressive Diagnosis of Massive MIMO Calibration State," Dec. 2017, pp. 666-677, Journal of Communications and Networks, vol. 19, No. 6, KICS.

ETRI, "Discussion on dynamic TDD and cross-link interface measurement in high-speed train scenario," Oct. 9-13, 2017, R1-1718001, 3GPP TSG RAN WG1 Meeting 90bis, Prague, Czech Republic.

3GPP TS 36.211 V15.7.0, "3rd Generation Partnership Project; Technical Specification Group Radio Access Network; Evolved Universal Terrestrial Radio Access (E-UTRA); Physical channels and modulation (Release 15)," Sep. 2019, 239 pages, 3GPP Organizational Partners.

3GPP TS 36.212 V15.7.0, "3rd Generation Partnership Project; Technical Specification Group Radio Access Network; Evolved Universal Terrestrial Radio Access (E-UTRA); Multiplexing and channel coding (Release 15)," Sep. 2019, 246 pages, 3GPP Organizational Partners.

3GPP TS 36.213 V15.7.0, "3rd Generation Partnership Project; Technical Specification Group Radio Access Network; Evolved Universal Terrestrial Radio Access (E-UTRA); Physical layer procedures (Release 15)," Sep. 2019, 551 pages, 3GPP Organizational Partners.

3GPP TS 38.211 V15.7.0, "3rd Generation Partnership Project; Technical Specification Group Radio Access Network; NR; Physical channels and modulation (Release 15)," Sep. 2019, 97 pages, 3GPP Organizational Partners.

3GPP TS 38.212 V15.7.0, "3rd Generation Partnership Project; Technical Specification Group Radio Access Network; NR; Multiplexing and channel coding (Release 15)," Sep. 2019, 101 pages, 3GPP Organizational Partners.

3GPP TS 38.213 V15.7.0, "3rd Generation Partnership Project; Technical Specification Group Radio Access Network; NR; Physical layer procedures for control (Release 15)," Sep. 2019, 108 pages, 3GPP Organizational Partners.

3GPP TS 38.214 V15.7.0, "3rd Generation Partnership Project; Technical Specification Group Radio Access Network; NR; Physical layer procedures for data (Release 15)," Sep. 2019, 106 pages, 3GPP Organizational Partners.

\* cited by examiner

Front loaded Type 1

1 symbol

Comb 2 + 2CS 2 symbols

Comb 2 + 2CS + T-OCC {1,1} {1,-1}

Front loaded Type 2

8.1

8.2

8.3

METHODS AND APPARATUSES FOR PROVIDING TRANSMIT/RECEIVE RELATIVE RADIO ALIGNMENT VERIFICATION

CROSS-REFERENCE TO RELATED APPLICATIONS

This application is a National stage of International Application No. PCT/SE2020/051210, filed Dec. 14, 2020, which claims priority to U.S. Application No. 62/949,839, filed Dec. 18, 2019, which are hereby incorporated by reference.

TECHNICAL FIELD

Embodiments described herein relate to methods and apparatuses for providing transmit/receive relative radio alignment verification utilizing reference signals. The methods and apparatuses described herein may be particularly useful in scenarios in which the number of available reference signals is limited.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Although terminology from Third Generation Partnership Project (3GPP) new radio (NR) and long term evolution (LTE) is used in this disclosure to describe particular embodiments, this should not be seen as limiting the scope of the embodiments to only the aforementioned systems. Other wireless systems, including wideband code division multiple access (WCDMA), worldwide interoperability for microwave access (WiMax), ultra-mobile broadband (UMB) and global system for mobiles (GSM), may also benefit from the embodiments described herein.

Terminology such as gNodeB/gNB, eNodeB/eNB and user equipment (UE) should be considering non-limiting and does not imply a certain hierarchical relation between the two; in general "eNodeB/gNodeB" could be considered as device 1 and "UE" device 2, and these two devices communicate with each other over a radio channel. Particular examples may include wireless transmissions in the downlink, but the embodiments are equally applicable in the uplink.

Some background on NR follows. Additional information can be obtained from the 3GPP specifications, including in particular the NR specifications 3GPP TS 38.211 V15.7.0, "NR; Physical channel and modulation", 3GPP TS 38.212 V15.7.0, "NR; Multiplexing and channel coding", 3GPP TS 38.213 V15.7.0, "NR; Physical layer procedures for control", 3GPP TS 38.214 V15.7.0, "NR; Physical layer procedures for data", and the corresponding specifications for LTE including 3GPP TS 36.211 V15.7.0, "Physical channels and modulation", 3GPP TS 36.212 V15.7.0, "Multiplexing and channel coding", and 3GPP TS 36.213 V15.7.0, "Physical layer procedures."

The fifth generation mobile wireless communication system (5G) or new radio (NR) supports a diverse set of use cases and a diverse set of deployment scenarios. The later includes deployment at both low frequencies (100s of MHz), similar to LTE, and very high frequencies (mm waves in the tens of GHz).

Similar to LTE, NR uses orthogonal frequency division multiplexing (OFDM) in the downlink (e.g., from a network node, gNB, eNB, or base station, to a user equipment or UE). The basic NR physical resource over an antenna port can be represented as a time-frequency grid as illustrated in FIG. 1, where a resource block (RB) in a 14-symbol slot is illustrated.

A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

NR supports different subcarrier spacing values. The supported subcarrier spacing values (also referred to as different numerologies) are given by $\Delta f=(15\times2^{\alpha})$ kHz where $\alpha \in (0,1,2,3,4)$, $\Delta f=15$ kHz is the basic (or reference) subcarrier spacing that is also used in LTE.

In the time domain, downlink and uplink transmissions in NR are organized into equally-sized subframes of 1 ms each, similar to LTE. A subframe is further divided into multiple slots of equal duration. The slot length for subcarrier spacing $\Delta f=(15\times2^{\alpha})$ kHz is $\frac{1}{2}^{\alpha}$ ms. There is only one slot per subframe at $\Delta f=15$ kHz and a slot consists of 14 OFDM symbols.

Downlink transmissions are dynamically scheduled, i.e., in each slot the gNB transmits downlink control information (DCI) about which UE data is to be transmitted to and which resource blocks in the current downlink slot the data is transmitted on. The control information is typically transmitted in the first one or two OFDM symbols in each slot in NR. The control information is carried on the physical downlink control channel (PDCCH) and data is carried on the physical downlink shared channel (PDSCH). A UE first detects and decodes PDCCH and if a PDCCH is decoded successfully, it then decodes the corresponding PDSCH based on the decoded control information in the PDCCH.

In addition to PDCCH and PDSCH, there are also other channels and reference signals transmitted in the downlink.

Uplink data transmissions, carried on physical uplink shared channel (PUSCH), are also dynamically scheduled by the gNB by transmitting a DCI. In case of time division duplex (TDD) operation, the DCI (which is transmitted in the downlink region) always indicates a scheduling offset so that the PUSCH is transmitted in a slot in the uplink region.

Demodulation reference signals (DM-RS) are used for coherent demodulation of physical layer data channels, PDSCH (DL) and PUSCH (UL), as well as of physical layer downlink control channel PDCCH. The DM-RS is confined to resource blocks carrying the associated physical layer channel and is mapped on allocated resource elements of the OFDM time-frequency grid such that the receiver can efficiently handle time/frequency-selective fading radio channels.

The mapping of DM-RS to resource elements is configurable in both frequency and time domain, with two mapping types in the frequency domain (configuration type 1 or type 2) and two mapping types in the time domain (mapping type A or type B) defining the symbol position of the first DM-RS within a transmission interval. The DM-RS mapping in time domain can further be single-symbol based or double-symbol based where the latter means that DM-RS is mapped in pairs of two adjacent symbols. Furthermore, a UE can be configured with one, two, three or four single-symbol DM-RS and one or two double-symbol DM-RS. In scenarios with low Doppler, it may be sufficient to configure front-loaded DM-RS only, i.e. one single-symbol DM-RS or one double-symbol DM-RS, whereas in scenarios with high Doppler additional DM-RS may be required.

FIG. 2 illustrates the mapping of front-loaded DM-RS for configuration type 1 and type 2 with single-symbol and double-symbol DM-RS and for the mapping type A with first DM-RS in third symbol of a transmission interval of 14 symbols. The different CDM groups are indicated by different shading patterns.

As illustrated, type 1 and type 2 differs with respect to both the mapping structure and the number of supported DM-RS code division multiplexing (CDM) groups where type 1 support 2 CDM groups and type 2 support 3 CDM groups.

A DM-RS antenna port is mapped to the resource elements within one CDM group only. For single-symbol DM-RS, two antenna ports can be mapped to each CDM group whereas for double-symbol DM-RS four antenna ports can be mapped to each CDM group. Hence, the maximum number of DM-RS ports for DM-RS type 1 is either four or eight. The maximum number of DM-RS ports for DM-RS type 2 it is either six or twelve. An orthogonal cover code (OCC) of length 2 ([+1, +1], [+1, −1]) is used to separate antenna ports mapped on the same resource elements within a CDM group. The OCC is applied in frequency domain as well as in time domain when double-symbol DM-RS is configured.

In NR Rel-15, the mapping of a PDSCH DM-RS sequence r(m), m=0, 1, . . . on antenna port $p_j$ and subcarrier k in OFDM symbol L for the numerology index μ is specified in TS38.211 as $$a_{k,l}^{(p_j,\mu)} = \beta_{DMRS}^{PDSCH} r_\lambda^{(p_j)}(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

where $$r_\lambda^{(p_j)}(2n+k') = w_f(k')w_t(l')r(2n+k')$$

represents the reference signal mapped on port $p_j$ in CDM group λ after applying OCC in frequency domain, $w_f(k')$, and time domain, $w_t(l')$. Table 1 and Table 2 show the PDSCH DM-RS mapping parameters for configuration type 1 and type 2, respectively.

TABLE 1

PDSCH DM-RS mapping parameters for configuration type 1.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 2

PDSCH DM-RS mapping parameters for configuration type 2.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

For PDSCH mapping type A, DM-RS mapping is relative to slot boundary. The first front-loaded DM-RS symbol in DM-RS mapping type A is in either the $3^{rd}$ or $4^{th}$ symbol of the slot. In addition to the front-loaded DM-RS, type A DM-RS mapping can consist of up to 3 additional DM-RS. Some examples of DM-RS for mapping type A are illustrated in FIG. 3 (note that PDSCH length of 14 symbols is assumed in the examples).

FIG. 3 illustrates example of DM-RS configurations for PDSCH Mapping Type A. The figure assumes that the PDSCH duration is the full slot. If the scheduled PDSCH duration is shorter than the full slot, the positions of the DM-RS changes according to the specification TS 38.211.
 or PDSCH mapping type B, DM-RS mapping is relative to transmission start. The first DM-RS symbol in DM-RS mapping type B is in the first symbol in which type B PDSCH starts. Some examples of DM-RS for mapping type A are illustrated in FIG. 4.

FIG. 4 illustrates examples of DM-RS configurations for PDSCH Mapping Type B.

NR defines channel state information reference signals (CSI-RS) for channel state information (CSI) measurement and feedback. A CSI-RS is transmitted on each transmit antenna (or antenna port) and is used by a UE to measure downlink channel between each of the transmit antenna ports and each of its receive antenna ports. The antenna ports are also referred to as CSI-RS ports. The supported number of antenna ports in NR are {1, 2, 4, 8, 12, 16, 24, 32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain REs in a slot and certain slots. FIG. 5 illustrates an example of CSI-RS REs for 12 antenna ports, where 1 RE per RB per port is shown.

FIG. 5 illustrates an example of RE allocation for a 12-port CSI-RS in NR.

In addition, interference measurement resource (IMR) is also defined in NR for a UE to measure interference. An IMR resource contains 4 REs, either 4 adjacent RE in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI, i.e. rank, precoding matrix, and the channel quality. Furthermore, a UE in NR may be configured to measure interference based on one or multiple NZP CSI-RS resource.

Sounding reference signals are used for a variety of purposes in LTE and serve even more purposes in NR. One primary use for SRS is for uplink channel state estimation, allowing channel quality estimation to enable uplink link adaptation (including determination of which MCS state the UE should transmit with) and/or frequency-selective scheduling. In the context of uplink multiple input multiple output (MIMO), they can also be used to determine precoders and the number of layers that will provide good uplink throughput and/or SINR when the UE uses them for transmission on its uplink antenna array. Additional uses include power control, uplink timing advance adjustment, beam management, and reciprocity-based DL precoding.

Unlike LTE Rel-14, at least some NR UEs may be capable of transmitting multiple SRS resources. This is similar conceptually to multiple CSI-RS resources on the downlink. An SRS resource comprises one or more antenna ports, and the UE may apply a beamformer and/or a precoder to the antenna ports within the SRS resource such that they are transmitted with the same effective antenna pattern. A primary motivation for configuring multiple SRS resources in the UE is to support analog beamforming in the UE where a UE can transmit with a variety of beam patterns, but only one at a time. Such analog beamforming may have relatively high directivity, especially at the higher frequencies that are supported by NR.

In NR the SRS sequence is UE-specifically configured Zadoff-Chu based sequence and an SRS resource consists of 1, 2 or 4 antenna ports. Another feature supported by NR is repetition of symbols within the resource with factor 1, 2 or 4. This means that the transmission may be extended to multiple OFDM symbols which is intended for improving the UL coverage of the SRS. An SRS resource always spans 1, 2 or 4 adjacent OFDM symbols and all ports are mapped to each symbol of the resource. SRS resources are mapped within the last 6 OFDM symbols of an uplink slot. SRS resources are mapped on either every second or every fourth subcarrier, that is with comb levels either 2 or 4. SRS resources are configured in SRS resource sets which contain one or multiple SRS resources. Some use cases and possible configurations of SRS is presented in the following sections in terms of a set of physical resources, where a resource is an allocation of REs in the resource grid as presented in FIG. 6.

For codebook based UL MIMO use cases, one or two SRS resources can be configured within an SRS resource set and each SRS resource contains up to 4 antenna ports. Three potential configurations of two SRS resources of one SRS resource set for codebook based transmission are illustrated in FIG. 7, where it is assumed that an SRS resource set containing two SRS resources have been configured. Each SRS resource is represented with a shade in the figures. In these examples, the comb level is two, and each resource is configured with a different comb offset.

In example 7-1 the SRS resources are transmitted in different OFDM symbols. In example 7-2 the SRS resources are transmitted in the same OFDM symbol. In example 7-3 a repetition factor of 2 is configured and the SRS resources are starting in different OFDM symbols and they are transmitted simultaneously in one OFDM symbol.

For non-codebook based UL MIMO use cases, up to four SRS resources can be configured within an SRS resource set and each SRS resource contains 1 antenna port. Three potential configurations of four SRS resources of one SRS resource set for non-codebook based transmission are illustrated in FIG. 8 where it is assumed that an SRS resource set containing four SRS resources have been configured. Each SRS resource is represented with a shade in the figures. In these examples, the comb level is four, and each resource is configured with a different comb offset.

In example 8-1 the SRS resources are transmitted in different OFDM symbols. In example 8-2 the SRS resources are transmitted in the same OFDM symbol. In example 8-3 a repetition factor of 2 is configured and the SRS resources are starting in different OFDM symbols and pairs of resources are transmitted simultaneously in some OFDM symbols.

For beam management uses cases, several SRS resources can be configured within potentially several SRS resource sets and each SRS resource contains 1 antenna port. At each OFDM symbol, only one SRS resource in each of the SRS sets can be transmitted. Three potential configurations of four SRS resources in either one or two SRS resource set(s) for beam management transmission are illustrated in FIG. 9, where also the SRS resource sets are illustrated. Each SRS resource is represented with a shade in the figures. In these examples, the comb level is four, and each resource is configured with a different comb offset.

In example 9-1a the 4 SRS resources from the same SRS resource set are transmitted in different OFDM symbols of the same slot. In example 9-2 the SRS resources from different SRS resource sets are transmitted in the same OFDM symbols. In example 9-1b the 4 resources from the same SRS resource set are spread out over multiple slots.

The following use case is to obtain knowledge of the entire downlink MIMO channel matrix from uplink measurements under the assumption of uplink-downlink channel reciprocity. As UEs have typically more RX chains than TX chains, the procedure of antenna switching is used to sound all antennas. Either two or four SRS resources are configured within an SRS resource set, for the case that the UE has either double or quadruple, respectively, more RX than TX chains. Three potential configurations of two or four SRS resources of one SRS resource set for antenna switching are illustrated in FIG. 10. Each SRS resource is represented with a different dotted patterns in the figures. In these examples, the comb level is two and all resources are configured with the same comb offset.

In example 10-1a, two SRS resources from the same SRS resource set are transmitted in different OFDM symbols of the same slot. The resources are either 1-port or 2-port for the case of either 1T2R (1 TX chain and 2 RX chains) or 2T4R, respectively. Different antenna ports are mapped to different resources. A guard period of at least one symbol is required due to the transient effects of the power when antennas are switched. Both cases with and without repetition factor are illustrated, in left and right of example 10-1a, respectively.

In example 10-1b, two SRS resources of the same SRS resource set, used for sounding different antennas, are configured in different slots. Then, no further guard period is required. In example 10-2b, four SRS resources from the same SRS resource set are transmitted in different slots. These resources are 1-port for the case of 1T4R and a different antenna port is mapped to a different resource.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The NR standard is currently evolving with enhanced MIMO support. A core component in NR is the support of MIMO antenna deployments and MIMO related techniques like for instance spatial multiplexing. The spatial multiplexing mode is aimed for high data rates in favorable channel conditions. An illustration of a transmission structure of precoded spatial multiplexing mode in NR is provided in FIG. 11.

As illustrated, the information carrying symbol vector s is multiplied by an $N_T \times r$ precoder matrix w, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI) (as described above with relation to CSI-RS), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE) (for example as illustrated in FIG. 1). The number of symbols r is typically adapted to suit the current channel properties.

NR and LTE use OFDM in the downlink and DFT precoded OFDM in the uplink (NR can optionally use OFDM in uplink as well) and hence the received $N_R \times 1$ vector $y_n$ for a certain TFRE on subcarrier n (or alternatively data TFRE number n) is thus modeled by $$y_n = H_n W s_n + e_n$$

where $e_n$ is a noise/interference vector obtained as realizations of a random process. The precoder w can be a wideband precoder, which is constant over frequency, or frequency selective.

The precoder matrix w is often chosen to match the characteristics of the $N_R \times N_T$ MIMO channel matrix $H_n$, resulting in channel dependent precoding. This is also commonly referred to as closed-loop precoding and essentially strives for focusing the transmit energy into a subspace which is strong in the sense of conveying much of the transmitted energy to the UE.

In closed-loop precoding for the NR downlink, the UE transmits, based on channel measurements in the forward link (downlink), recommendations to the gNB of a suitable precoder to use. The gNB configures the UE to provide feedback according to CSI-ReportConfig and may transmit CSI-RS and configure the UE to use measurements of CSI-RS to feed back recommended precoding matrices that the UE selects from a codebook.

A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of channel state information (CSI) feedback, which also encompasses feeding back other information than recommended precoders to assist the gNodeB in subsequent transmissions to the UE. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 PRBs depending on the band width part (BWP) size (see above description relating to CSI-RS).

Given the CSI feedback from the UE, the gNB determines the transmission parameters it wishes to use to transmit to the UE, including the precoding matrix, transmission rank, and modulation and coding scheme (MCS). These transmission parameters may differ from the recommendations the UE makes. The transmission rank, and thus the number of spatially multiplexed layers, is reflected in the number of columns of the precoder w. For efficient performance, it is important that a transmission rank that matches the channel properties is selected.

Proper transmit radio alignment is important for ensuring that signals do not undergo unwanted distortion when transmitted. Such distortion can involve phase and/or amplitude errors of the transmit signals compared with the nominal amplitudes and signals intended from the baseband processing. Such misalignment usually appears from non-idealities in the analog part of the radio chain and/or connecting cables and antennas. Similar misalignment issues may exist for reception.

Requirements on radio misalignment are often set so to ensure proper operation of the system. For example, a base station may not be able to form a beam shape sufficiently close to the intended beam shape if misalignment introduces large phase errors between radio/antenna branches. In receive direction, large misalignment may mean that direction of arrival estimation becomes erroneous.

In reciprocity-based beamforming/precoding, reverse link measurements (e.g. uplink for a base station) are used to estimate the reverse link channel. The propagation channel is reciprocal so unless additional misalignment is introduced by the radio parts, the forward (e.g. downlink) and reverse link (e.g. uplink) channels are the same assuming that the links use the same frequency allocation as in time-division duplex (TDD) operation. With such channel reciprocity, the reverse link channel estimates can be used to determine precoders/beamformers that are suitable for the forward link channel as well.

In practice, the radio parts may introduce considerable misalignment and the misalignment can be different for forward and reverse link directions in a unit (e.g. a base station/gNB) which destroys the reciprocity. It is thus important to design the system in such a way so that it fulfills needed requirements on radio alignment. A case of particular importance is to ensure that the alignment between radio chains of Tx is sufficiently similar to the alignment of radio chains in Rx, i.e., the Tx relative Rx misalignment should be small. This may often be ensured by various online calibration procedures applied within for example a base station.

There currently exist certain challenges. Despite implementation efforts targeting fulfilling needed relative Tx/Rx radio alignment requirements, misalignment may in practice anyway occur due to faulty implementation. There is however currently lack of a good and efficient ways of verifying that such alignment requirements are fulfilled. Current methods often inspect beam patterns for forward and reverse links and based on the similarity between them attempt to conclude that relative Tx/Rx radio alignment requirements are satisfied. Beam pattern are however very insensitive to the small phase and amplitude errors that can maximally be tolerated and are thus not an accurate tool for determining whether requirements are fulfilled.

Certain aspects of the present disclosure and their embodiments may provide solutions to these or other challenges. For example, some embodiments include an over-the-air method for verifying that radio alignment requirements between Tx and Rx are fulfilled for a multi-antenna system. The fulfillment of such alignment requirements is important whenever spatial information obtained from received signals are used for transmit purposes, e.g. as in reciprocity-based beamforming.

In particular embodiments, a measurement device transmits a reference signal (e.g., SRS) from one measurement antenna to the multi-antenna system (e.g., a base station) so that the multi-antenna system can estimate the reverse link vector channel from the measurement antenna to all of its antennas. The multi-antenna system furthermore reuses an existing reference signal feature (e.g., DM-RS) for transmission in the forward link to the measurement antenna. This enables the measurement device to determine the forward link vector channel. The multi-antenna system often has more antennas than there are reference signals. To deal with that, the channels for all the multi-antenna system antennas are obtained by transmitting reference signals on a subset of the antennas at a time (e.g., in a slot) and change the antenna subset from one slot to another.

The forward vector channels are time stamped by the multi-antenna system while the reverse link vector channels are time stamped by the measurement device. This enables the obtained forward and reverse link channels to be synced in time to minimize errors sources before comparing the forward and reverse link channels with each other to verify that radio misalignment requirements are fulfilled.

In general, the measurement device measures and estimates the forward link channels (or at least extracts data that can be used to determine those channels) from the antennas of the multi-antenna system to a measurement antenna of the measurement device over a number of time slots. The channel data is time stamped using a first timer and optionally a second timer. The second timer is related with the radio frame number signaled in the MIB as well as the slot number within a radio frame. The measurement device transmits a reference signal from the measurement antenna to the multi-antenna system.

At the multi-antenna system (base station) side reference signals are transmitted from a subset of the antennas of the multi-antenna system to the measurement antenna in a slot. The subset of antennas is cycled through the complete set of antennas over a time interval of slots. In a slot, one of the antennas may optionally always be used to transmit a reference signal from to provide phase tracking while the other references signals are cycled over the antennas over some time interval of slots. The multi-antenna system measures and estimates the reverse link channels (or at least extra corresponding data that can be used to estimate the channels) from the measurement antenna to antennas of the multi-antenna system based on the transmitted reference signal. Channels are measured over a multitude of slots and are time stamped using a first timer and optionally a second more accurate timer. The second timer can be derived from a slot number counter in the verification device from which the radio frame number in the MIB is derived.

In some embodiments, comparison between forward and reverse link channels may be performed in various locations. The comparison may use the time stamp information in the channel data from the multi-antenna system and from the measurement device to find forward link and reverse link channels sufficiently close in time. Some embodiments compare the forward and reverse link channels to verify that requirements are met, e.g. phase and amplitude differences are sufficiently small between forward and reverse link relative channel coefficients, where a relative channel coefficient is obtained as the ratio of the channel coefficient corresponding to the verification device antenna and the first verification device antenna.

There are, proposed herein, various embodiments which address one or more of the issues disclosed herein. Certain embodiments may provide one or more of the following technical advantages. For example, particular embodiments provide a faster and more accurate way of determining whether relative Tx/Rx radio alignment requirements are fulfilled. Particular embodiments include minimal additional implementation complexity in the multi-antenna system, reusing functionality related to channel estimation, reference signal generation and precoding in the multi-antenna system, functionality that is anyway implemented in a typical base station and/or Advanced Antenna System (AAS).

SUMMARY

According to some embodiments there is provided a method performed by a network node for determining radio alignment of a full downlink channel and a full uplink channel between a wireless device and a multi-antenna base station comprising a plurality of antennas. The method comprises obtaining downlink channel data, wherein the downlink channel data comprises: estimates of a plurality of downlink channels each associated with a downlink reference signal being received from one of the plurality of antennas at the wireless device, and time synchronization information associated with each of the plurality of downlink channels; obtaining uplink channel data, wherein the uplink channel data comprises: estimates of a plurality of uplink channels each associated with an uplink reference signal being received at one of the plurality of antennas from the wireless device, and time synchronization information associated with each of the plurality of uplink channels; and comparing the downlink channel data and the uplink channel data to determine whether the downlink channel and uplink channel between the wireless device and the multi-antenna base station are aligned.

According to some embodiments there is provided a method performed by a wireless device in communication with a multi-antenna base station for radio alignment of downlink channels and uplink channels between the wireless device and the multi-antenna base station.

The method comprises transmitting uplink reference signals from an antenna in the wireless device to the multi-antenna base station, wherein the uplink reference signals are transmitted across multiple time instances; receiving downlink reference signals from the multi-antenna base station wherein the downlink reference signals are received over multiple time instances; and determining downlink channel data, wherein the downlink channel data comprises: estimates of a plurality of downlink channels associated with each of the downlink reference signals, and time synchronization information associated with each of the plurality of downlink channels.

According to some embodiments there is provided a method performed by a multi-antenna base station comprising a plurality of antennas in communication with a wireless device for radio alignment of downlink channels and uplink channels between the wireless device and the multi-antenna base station. The method comprises transmitting, to the wireless device, a plurality of downlink reference signals from a first subset of the plurality of antennas in a first time instance; transmitting, to the wireless device, the plurality of downlink reference signals from a second subset of the plurality of antennas in a second time instance; receiving uplink reference signals from an antenna in the wireless device wherein the uplink reference signals are received over multiple time instances; and determining uplink channel data, wherein the uplink channel data comprises: estimates of a plurality of uplink channels associated with each of the uplink reference signals received at each of the plurality of antennas, and time synchronization information associated with each of the plurality of uplink channels.

According to some embodiments there is provided a wireless device in communication with a multi-antenna base station for radio alignment of downlink channels and uplink channels between the wireless device and the multi-antenna base station. The wireless device comprises processing circuitry configured to: transmit uplink reference signals from an antenna in the wireless device to the multi-antenna base station, wherein the uplink reference signals are transmitted across multiple time instances; receive downlink reference signals from the multi-antenna base station wherein the downlink reference signals are received over multiple time instances; and determine downlink channel data, wherein the downlink channel data comprises: estimates of a plurality of downlink channels associated with each of the downlink reference signals, and time synchronization information associated with each of the plurality of downlink channels.

According to some embodiments there is provided a multi-antenna base station comprising a plurality of antennas in communication with a wireless device for radio alignment of downlink channels and uplink channels between the wireless device and the multi-antenna base station. The multi-antenna base station comprises processing circuitry configured to: transmit, to the wireless device, a plurality of downlink reference signals from a first subset of the plurality of antennas in a first time instance; transmit, to the wireless device, the plurality of downlink reference signals from a second subset of the plurality of antennas in a second time instance; receive uplink reference signals from an antenna in the wireless device wherein the uplink reference signals are received over multiple time instances; and determine uplink channel data, wherein the uplink channel data comprises: estimates of a plurality of uplink channels associated with each of the uplink reference signals received at each of the plurality of antennas, and time synchronization information associated with each of the plurality of uplink channels.

According to some embodiments there is provided a network node for determining radio alignment of a full downlink channel and a full uplink channel between a wireless device and a multi-antenna base station comprising a plurality of antennas. The network node comprises processing circuitry configured to: obtain downlink channel data, wherein the downlink channel data comprises: estimates of a plurality of downlink channels each associated with a downlink reference signal being received from one of the plurality of antennas at the wireless device, and time synchronization information associated with each of the plurality of downlink channels; obtain uplink channel data, wherein the uplink channel data comprises: estimates of a plurality of uplink channels each associated with an uplink reference signal being received one of the plurality of antennas from the wireless device, and time synchronization information associated with each of the plurality of uplink channels; and compare the downlink channel data and the uplink channel data to determine whether the downlink channel and uplink channel between the wireless device and the multi-antenna base station are aligned.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The radio alignment requirement procedure involves acquiring forward link and reverse link channel data between a base station equipped with N antennas (radio chains, an antenna may here also correspond to a subarray of antenna elements) and a measurement antenna of a measurement device. Based on the acquired data, a comparison of resulting forward and reverse link channels is made to ensure that they are sufficiently similar. The comparison should be performed for channels taken at time instances sufficiently close to each other for maximum accuracy.

Figure 1:
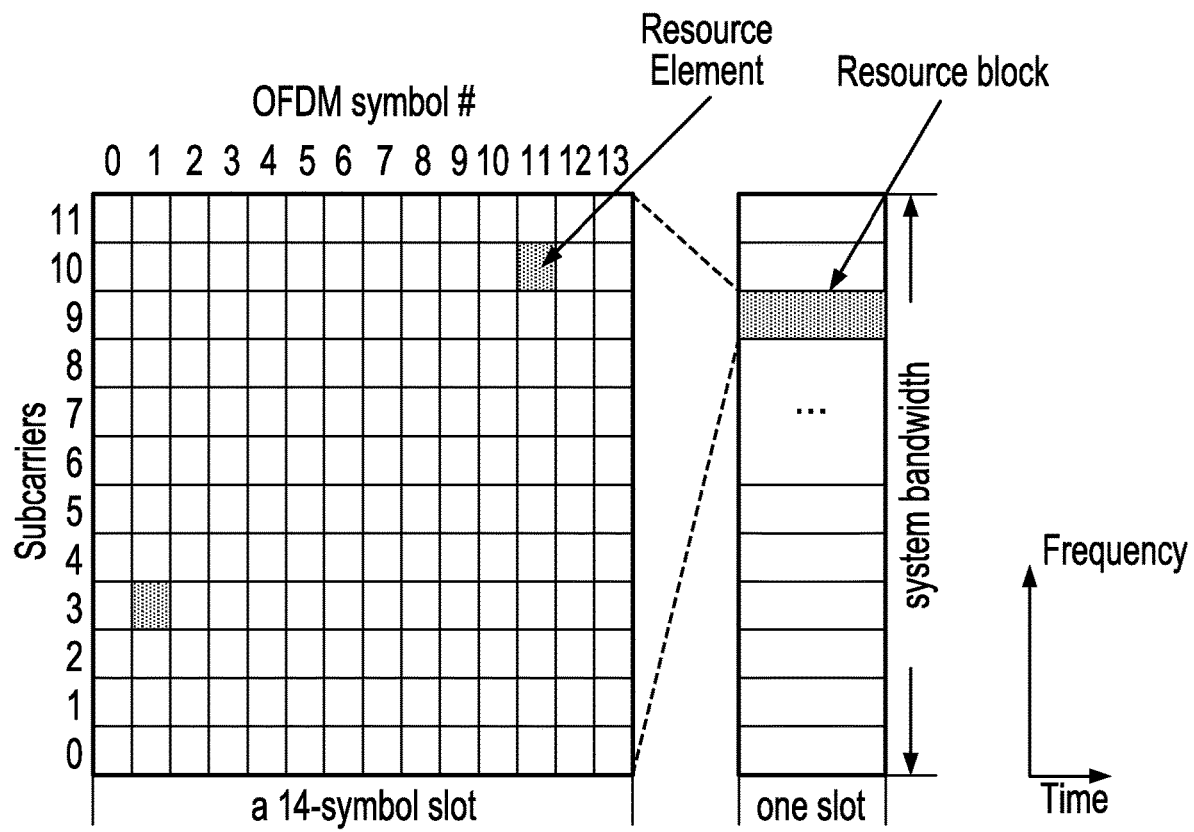
FIG. 1 illustrates the basic NR physical resource over an antenna port as a time-frequency grid.
Figure 2:
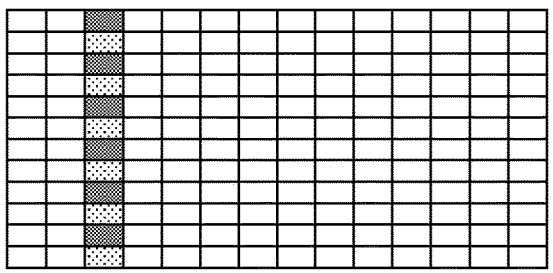
FIG. 2 illustrates the mapping of front-loaded DM-RS for configuration type 1 and type 2 with single-symbol and double-symbol DM-RS and for the mapping type A with first DM-RS in third symbol of a transmission interval of 14 symbols.
Figure 2:
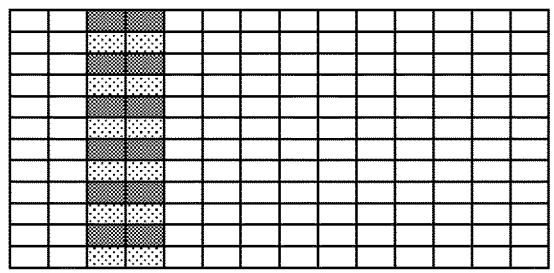
Figure 2:
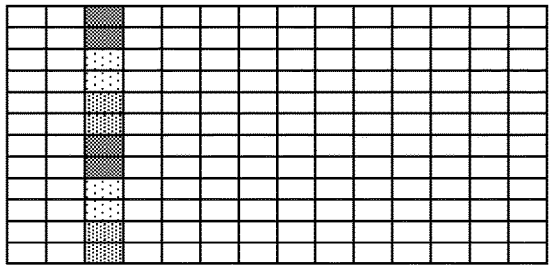
Figure 2:
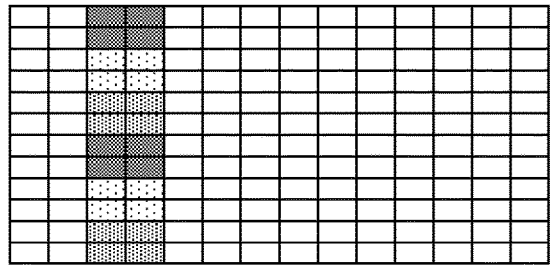
Figure 3:
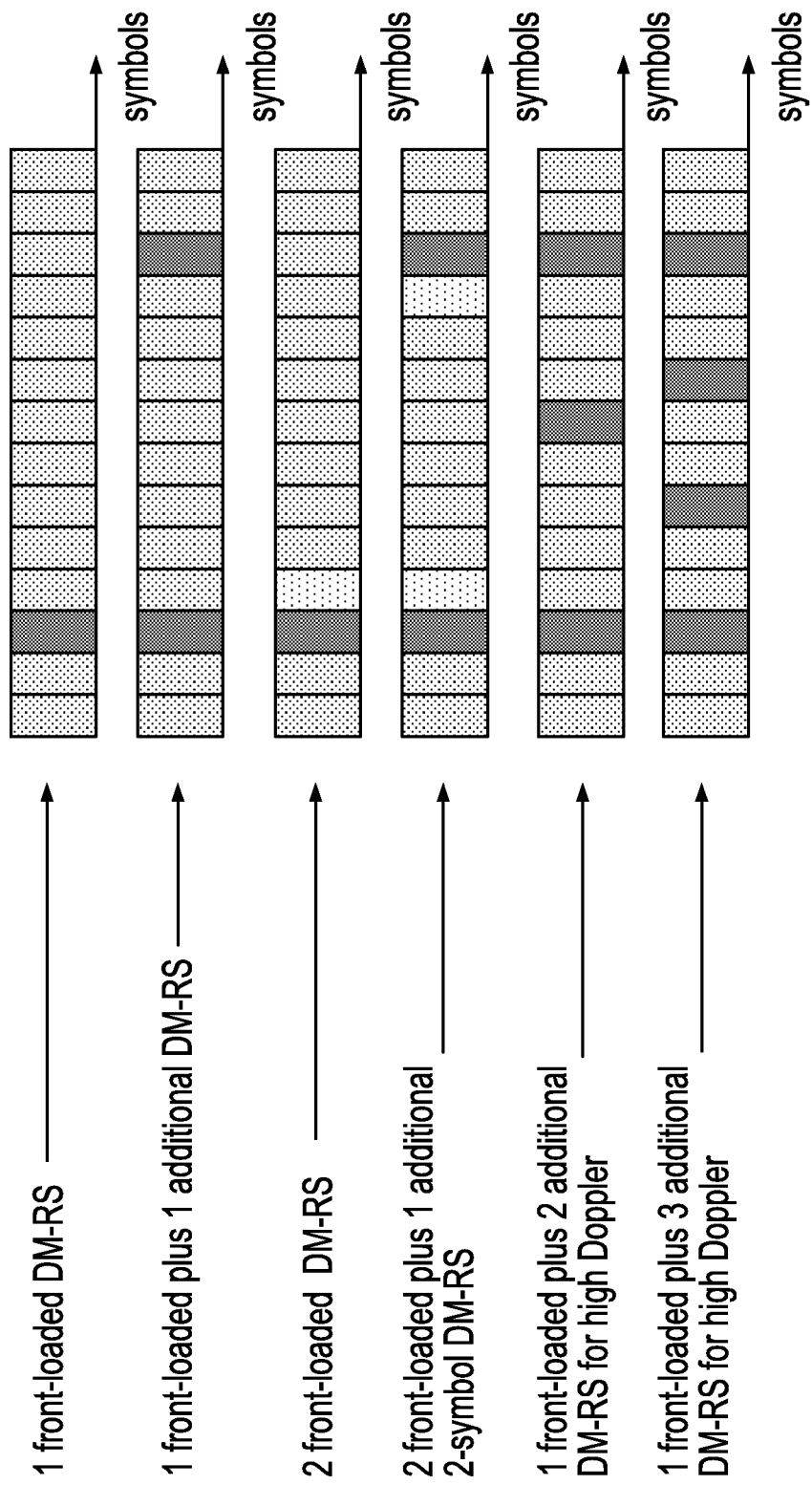
FIG. 3 illustrates example of DM-RS configurations for PDSCH Mapping Type A.
Figure 4:
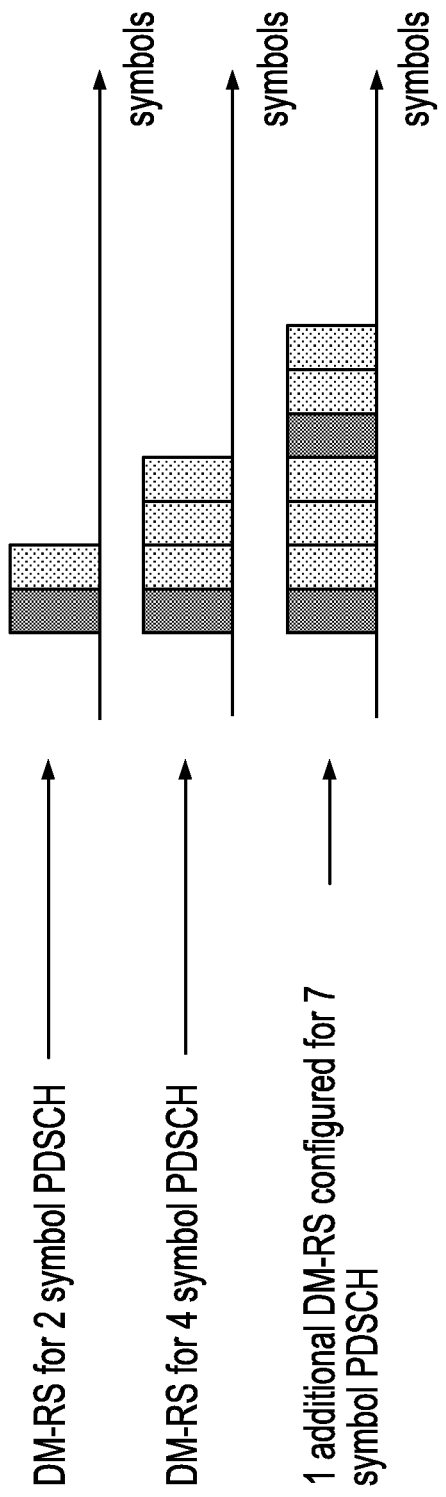
FIG. 4 illustrates examples of DM-RS configurations for PDSCH Mapping Type B.
Figure 5:
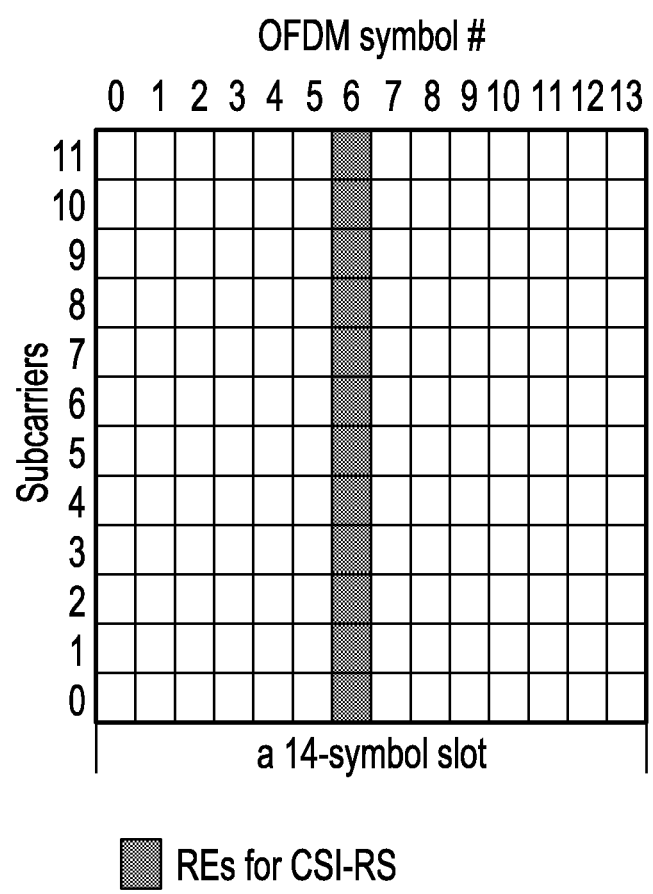
FIG. 5 illustrates an example of RE allocation for a 12-port CSI-RS in NR.
Figure 6:
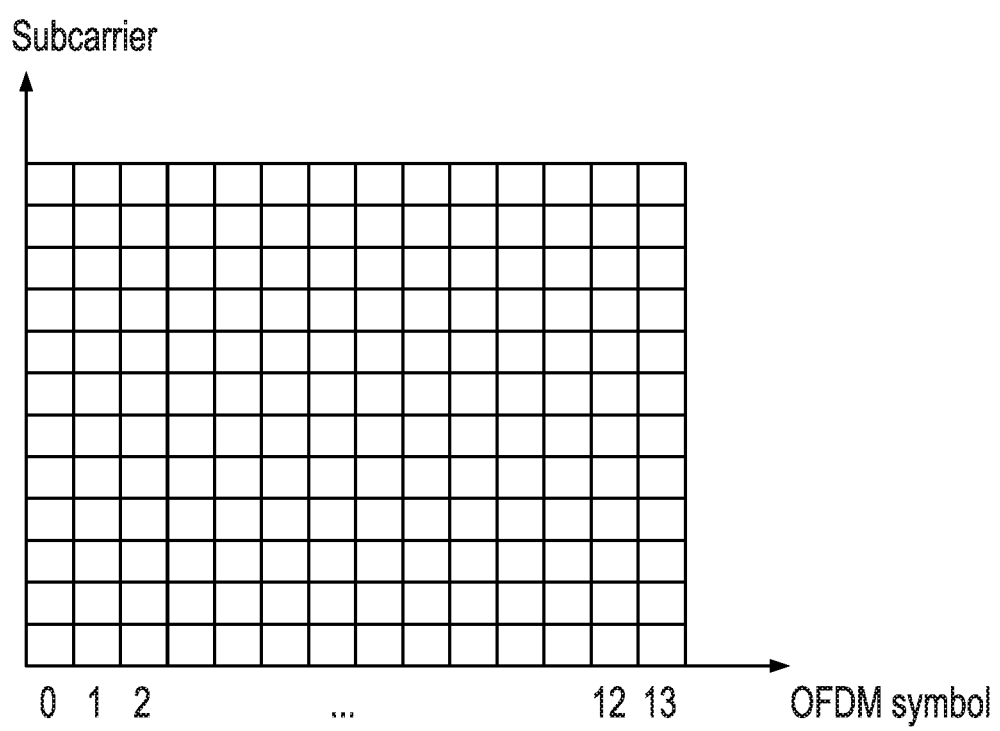
FIG. 6 illustrates a resource grid.
Figure 7:
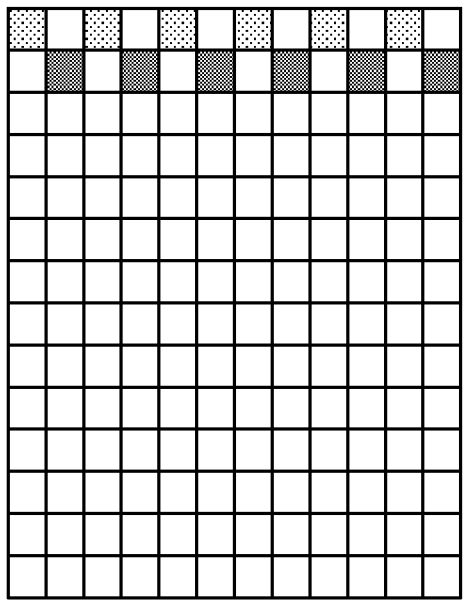
FIG. 7 illustrates three potential configurations of two SRS resources of one SRS resource set for codebook based transmission.
Figure 7:
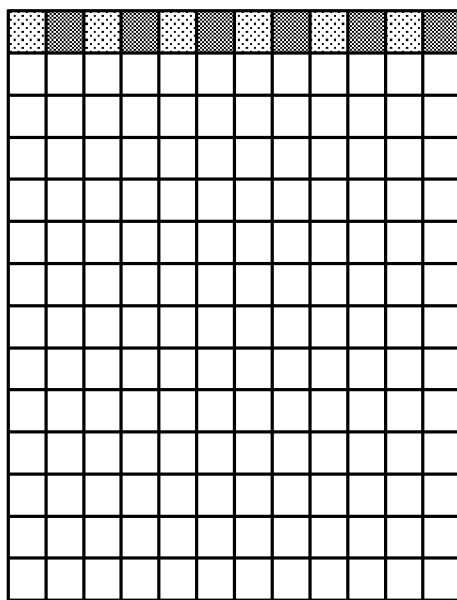
Figure 7:
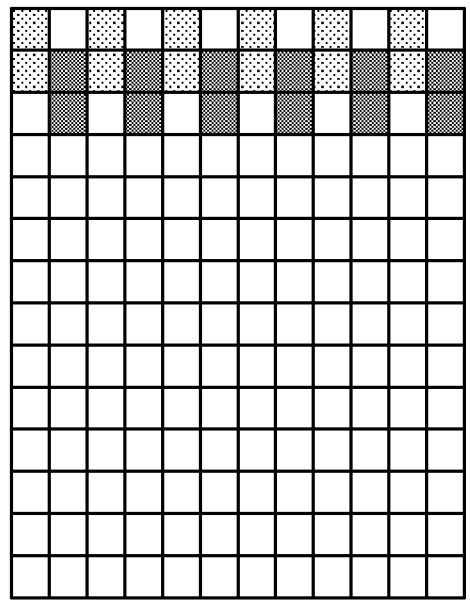
Figure 8:
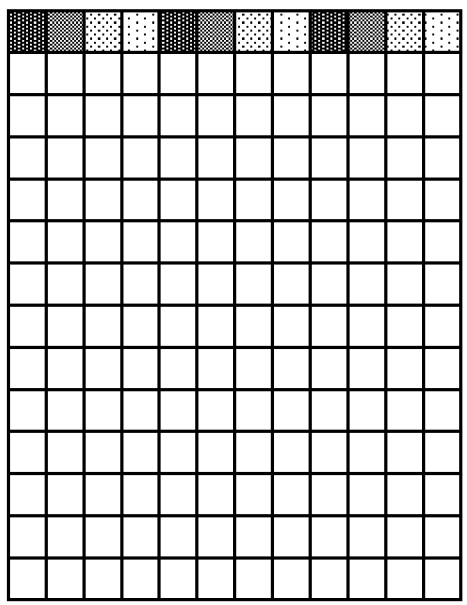
FIG. 8 illustrates three potential configurations of four SRS resources of one SRS resource set for non-codebook based transmission.
Figure 8:
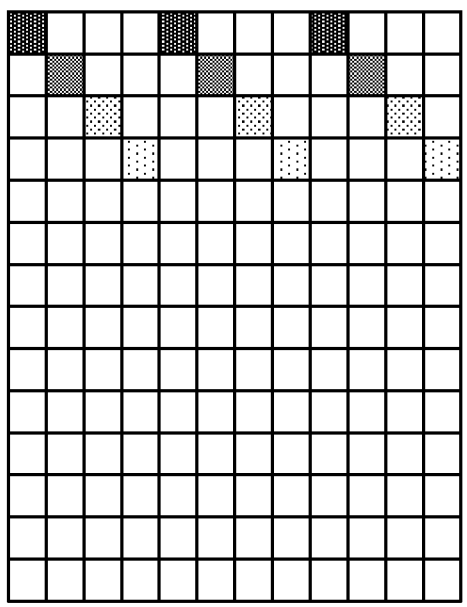
Figure 8:
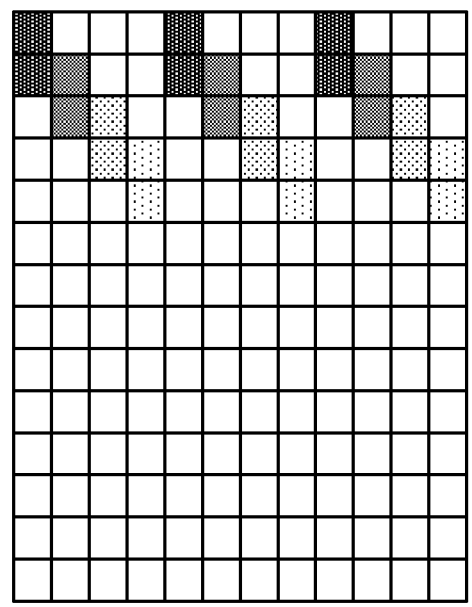
Figure 9:
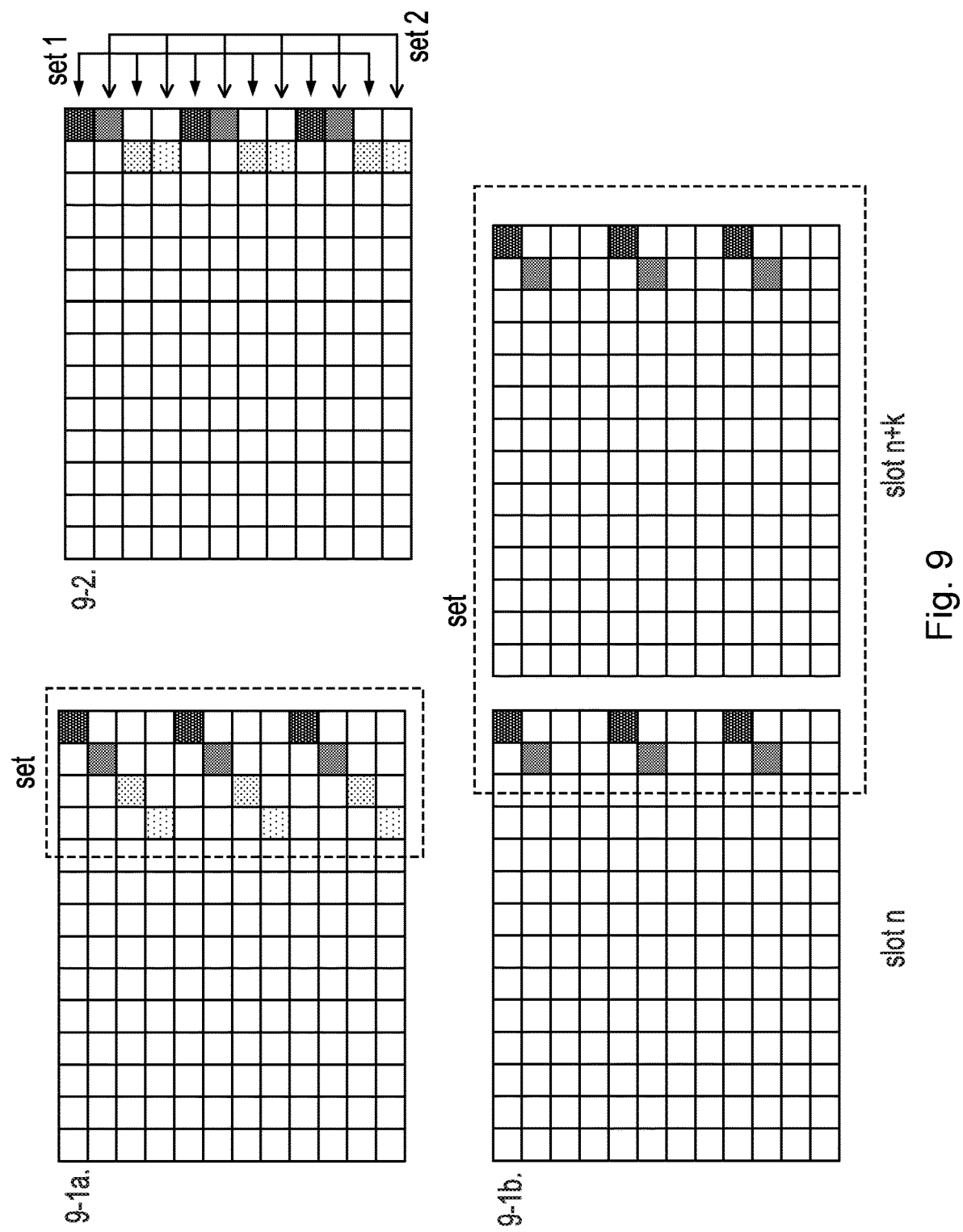
FIG. 9 illustrates three potential configurations of four SRS resources in either one or two SRS resource set(s) for beam management transmission.
Figure 10:
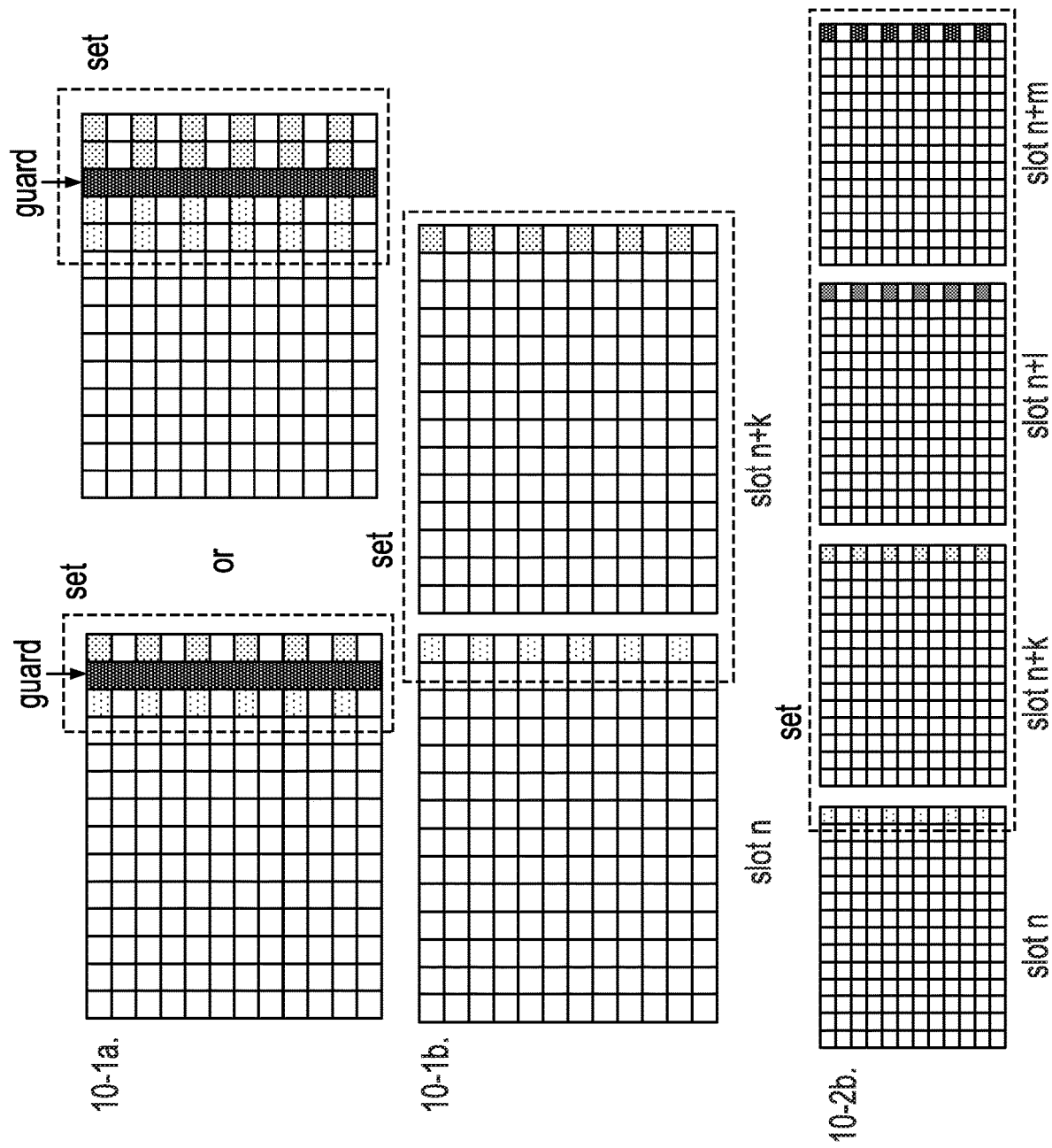
FIG. 10 illustrates three potential configurations of two or four SRS resources of one SRS resource set for antenna switching.
Figure 11:
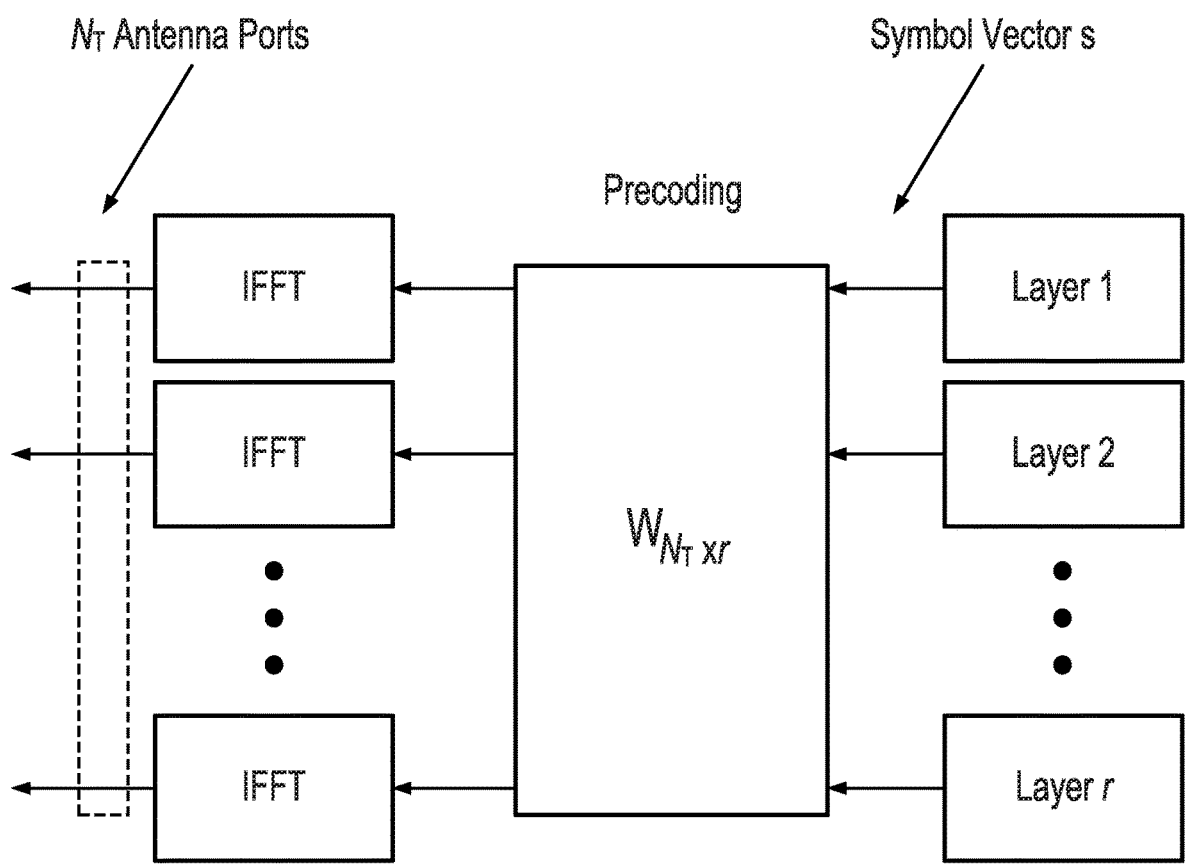
FIG. 11 illustrates a transmission structure of precoded spatial multiplexing mode in NR.
Figure 12:
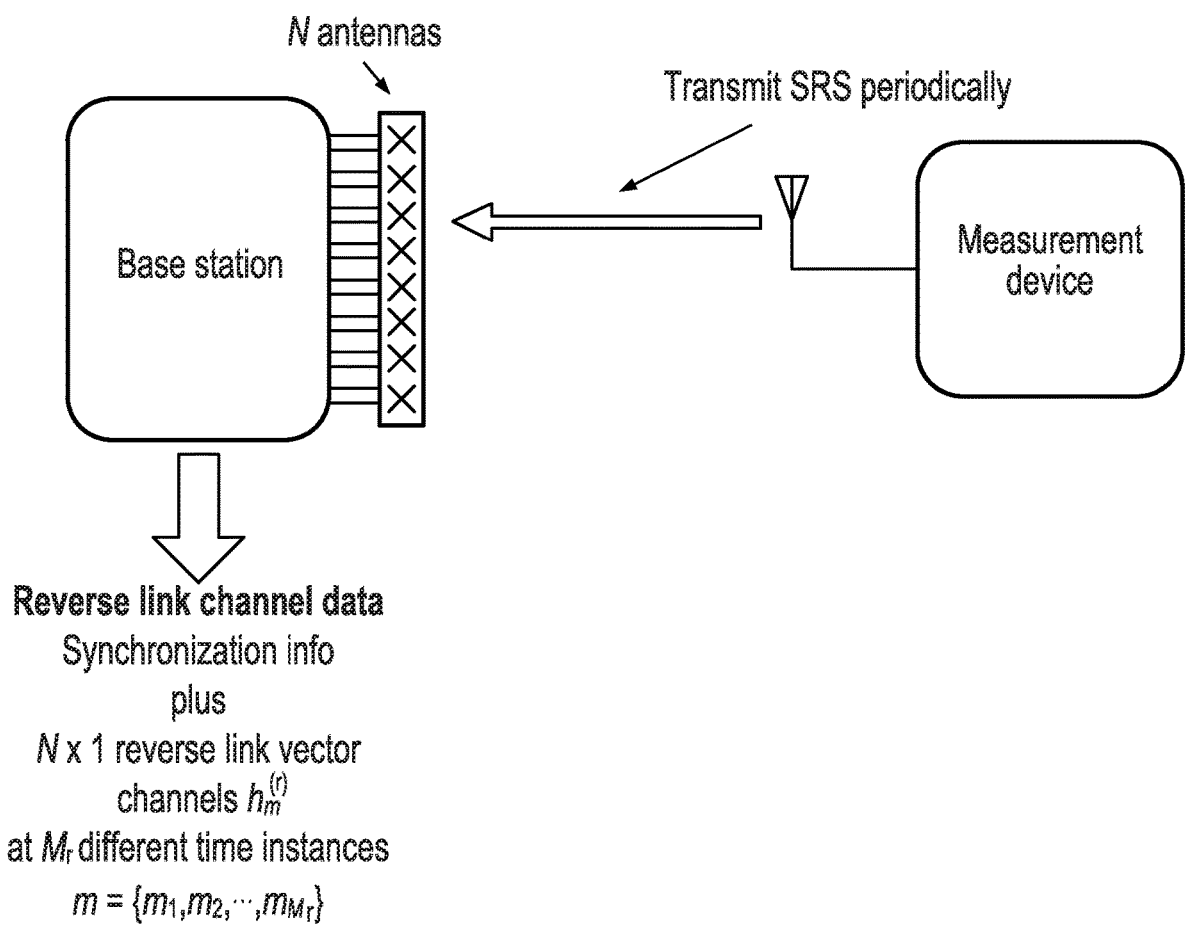
FIG. 12 illustrates obtaining reverse link (e.g. uplink) channel data from periodic SRS transmission from measurement antenna at measurement device to base station.

FIG. 12 illustrates obtaining reverse link (e.g. uplink) channel data from periodic SRS transmission from measurement antenna at measurement device to base station. The channel data spans at least the band width over which the alignments requirements are to be verified so hence the vector channels are in general a function of frequency and multiple frequency snapshots may be part of the channel data In some embodiments, as illustrated in FIG. 12, reverse link channel data is obtained where a measurement device transmits sounding reference signals (pilots) from a measurement antenna to the base station. The SRS is transmitted in multiple slots to capture channels for many time instances. This embodiment indicates a periodic transmission pattern usually covering the whole carrier bandwidth over which alignment should be verified, but other more arbitrary transmission patterns and bandwidths are also possible.

Upon reception of the transmitted SRS on the base station side, the base station estimates the vector-valued N×1 channel over some bandwidth (usually the whole carrier bandwidth), together with some synchronization data that facilitates in a later step ensuring that forward and reverse link channels are compared for sufficiently close time instances. A multi-antenna base station often already has SRS based channel estimation implemented so the acquirement of channel data involves very little extra complexity in the implementation because much of the existing implementation is reused in including channel estimation. Variations of this embodiment includes transmitting other reference signals than SRS from the measurement device, for example DM-RS and reusing the existing DR-MS based channel estimation in the base station for the channel data.

The synchronization data may include a time stamp for each obtained vector channel indicating what time instance the vector channel corresponds to.

Figure 13:
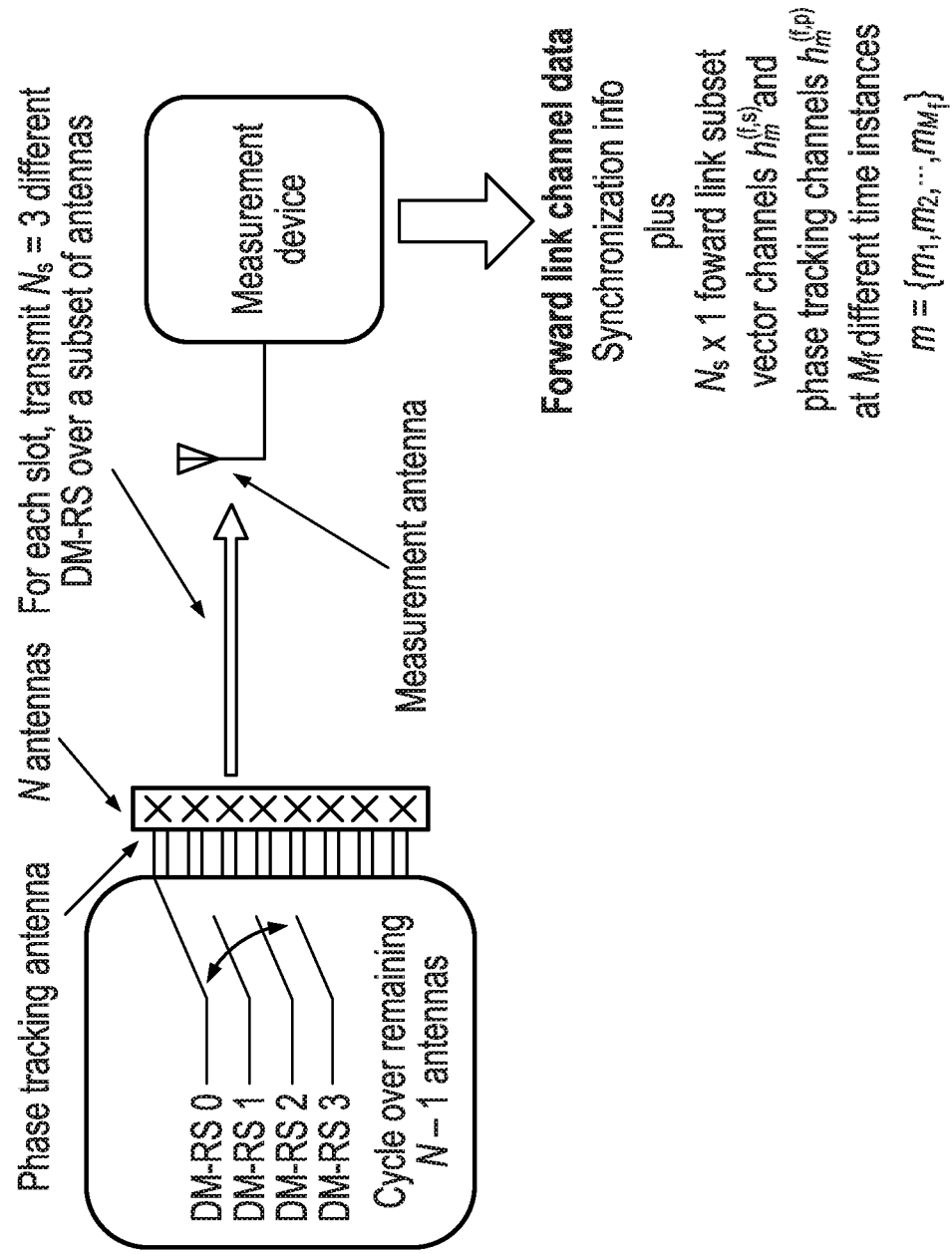
FIG. 13 illustrates obtaining forward link (e.g. downlink) channel data from base station to measurement antenna of measurement device by cycling a set of DM-RS over the antennas of the array as the slots progress.

FIG. 13 illustrates obtaining forward link (e.g. downlink) channel data from base station to measurement antenna of measurement device by cycling a set of DM-RS over the antennas of the array as the slots progress. The channel data spans at least the band width over which the alignments requirements are to be verified so hence the vector and phase tracking channels are in general a function of frequency and multiple frequency snapshots may be part of the channel data.

Forward link (e.g. downlink) channel data is obtained as illustrated in FIG. 13. The base station transmits DM-RS to the measurement device so that the measurement device can extract data from which it is possible to determine the vector-valued N×1 forward link channel. The DM-RS is usually transmitted over at least some bandwidth for which the radio alignment requirements are desired to be verified for (the same goes for the SRS transmissions). The number of DM-RS is usually less than the number of antennas N. To still acquire the channels for all N antennas, the DM-RS in a slot is transmitted from only a subset of the antennas. Within that subset, each DM-RS could have a one-to-one mapping to antennas (although other mappings would also be possible). The subset can then be altered during the progression of slots. Changing the subset from one slot to another by cycling over the antennas can be used to provide the full vector channel. For example, with 4 different DM-RS and N=64 antennas, the full vector channel could be obtained in 64/4=16 consecutive downlink slots.

The base station clock and the measurement device clock may be running at somewhat different rate leading to phase rotations of the estimated channels over time. This is a problem for the present case as the channel estimation is spread out over significant time (multiple slots). To mitigate this issue, one possibility as illustrated in the figure is to use one of the DR-MS as a phase tracking reference and use that DM-RS to always transmit from the same (e.g., the first) antenna. This allows the phase rotation over different slots to be estimated and used for de-rotating the channel estimates of the other DM-RS. For example, and as shown in the figure, if DM-RS 0 is used to provide phase tracking on the first antenna, then DM-RS 1-3 may be used to cycle through the remaining N−1 antennas in ceil(N−1)/3 slots, where the ceil( ) operation is defined as rounding upwards to the nearest integer. With N=64, this means it takes at least 21 consecutive downlink slots to cover all the antennas. The channel from the three non-phase tracking DM-RS is referred to as the subset vector channel.

Similar as for the reverse channel data acquisition, synchronization data may also be part of the forward channel data, including a time stamp for each obtained subset vector channel indicating the time instance corresponding to the vector channel.

Other kinds of reference signals than DM-RS may be used. CSI-RS is one example. The use of TRS is also possible. The main advantage of using DM-RS is that the base station is likely already prepared for mapping the DM-RS onto the antennas in rather flexible and dynamic manner via the use of precoding so the mapping and cycling mainly becomes an issue of configuring a pattern of precoders to cycle over, with minimal additional implementation effort.

To use time stamping in forward and reverse link channel data for comparing channels from sufficiently similar time instances requires accurate synchronization of the clocks in the base station and in the measurement device. This can be challenging so to reduce the requirements on such clock synchronization additional time stamp information can be included. For example, the base station may have a counter for the slot number which therefore can easily be included as an additional time stamp in the reverse link channel data.

The broadcast channel in NR (MIB) transmits ten bits indicating the radio frame number and a radio frame is in turn equal to 10 ms, which with a 30 kHz subcarrier spacing corresponds to 20 slots as an example. Thus, in the latter example, the transmitted radio frame number is a function of the slot counter as: radio frame number=floor(slot number/20) where the floor( ) operation is defined as rounding downwards to the nearest integer.

The MIB also enables a receiver such as the measurement device to determine the starting slot for each radio frame. Thus, the so signaled radio frame number can be used by the measurement device to also count slots synchronized with the slot counter on the base station side according to: base station slot number modulo 20*2^10=measurement equipment slot number modulo 20*2^10.

Such a slot counter in the measurement device can be used by the measurement device to further time stamp a subset vector channel and phase tracking channel in a slot.

Continuing the 30 kHz subcarrier spacing example, the resulting slot duration of 0.5 ms means that the slot counters on both sides of the link can be used to disambiguate clock synchronization errors within 20*2^10*0.5 ms=10.24 seconds, thus greatly relaxing the synchronization requirements on the first mentioned time stamps.

Other means of synchronization are also possible. For example, a cable between base station and measurement device can be used to achieve synchronization. Another possibility is to encode slot or frame number as part of the DM-RS transmission.

Figure 14:
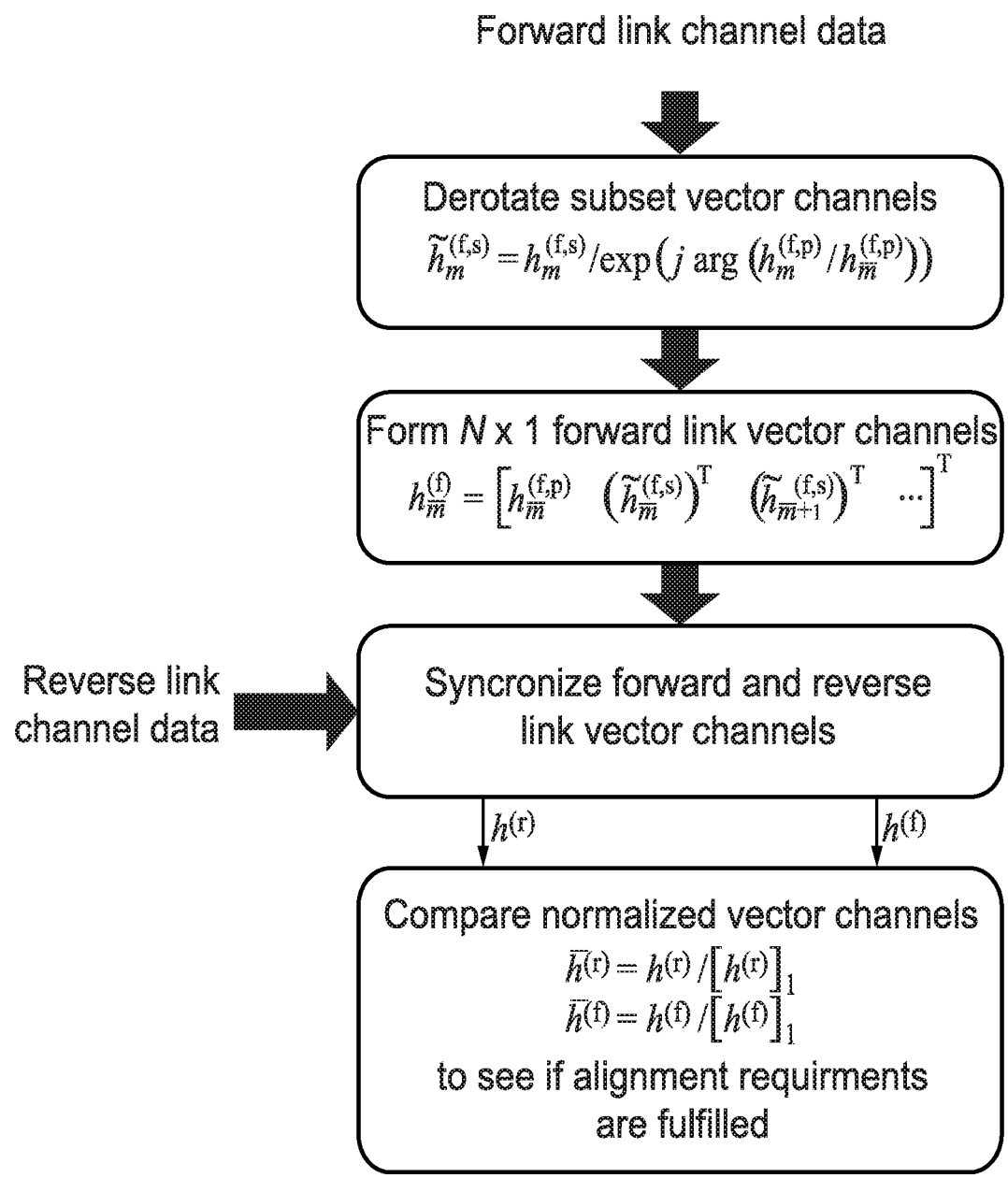
FIG. 14 illustrates some example processing steps.

In particular embodiments, the forward and reverse channel data is compared to verify that radio alignment requirements are fulfilled. Before doing that, some embodiments may process the data. Some example processing steps are illustrated in FIG. 14. The forward link channel data is first converted from individual subset vector and phase tracking channels to full vector channels as follows.

The subset channel is de-rotated by the phase difference of the phase tracking channel at time instant m and $\tilde{m}$. This provides an estimate of the subset channel at time instance m as if the base station and measurement device clocks were running at identical rate.

The de-rotated subset channel from a set of, preferably consecutive, slots are stacked on top of each other to, together with the phase tracking channel form an estimate of the full forward vector channel $h_{\tilde{m}}^{(f)}$ at time instant $\tilde{m}$, which is preferably picked corresponding to one of the slots in the mentioned set of slots.

The time stamps and any additional time stamp information like the previously mentioned slot counter from both the forward and reverse channel data may now in a synchronization step be compared to accurately determine which vector channel from the forward channel data should be compared with which channel from the reverse link data. The comparison is performed with respect to normalized vector channels obtained by dividing a vector channel by its first element. Phase and amplitude difference between corresponding elements of the forward and reverse link channels can now be analyzed and compared with alignment requirements. In an ideal world with no misalignment and no estimation errors, $\bar{h}^{(r)}$ and $\bar{h}^{(f)}$ should be identical.

The processing of channel data, synchronization and comparison may be done outside the base station and measurement equipment. The base station and measurement equipment could for example save the reverse and forward link channel data, respectively, corresponding to a large number of slots in files and these files could be loaded and analyzed offline. Streaming of the data could to some location could also be an alternative allowing for more real time analysis, including streaming to cloud.

Alternatively, some or all these steps may be performed by the base station or the measurement device. The processing of the forward channel data may for example by performed by the measurement device. The comparison requires access to both the forward and reverse link channel data and hence at least one of these two needs to be conveyed to the other side of the link The channel data could include accurate channel estimates obtained after processing and filtering in respective unit (base station or measurement device) but it could alternatively correspond to raw channel estimates or even just I/Q data of certain OFDM symbols with little or no processing. Further de-spreading, filtering across time and/or frequency or processing may then be needed and conducted outside the base station and/or measurement device (e.g. in offline or streaming alternatives). A benefit of such a strategy is that there is more control over the processing and more efficient algorithms can be utilized when real time and/or computational constraints are relaxed.

The measurement device could correspond to or include a UE and this would allow very easy radio alignment verification in field on deployed systems at site.

Figure 15:
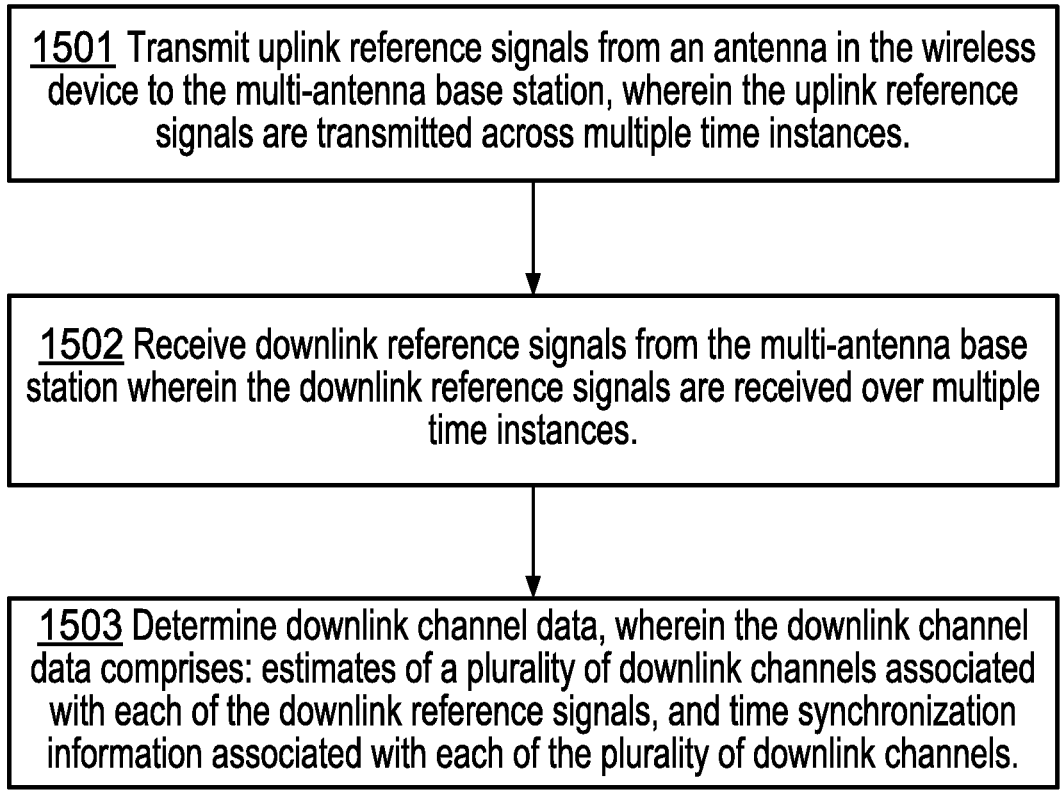
FIG. 15 illustrates a method performed by a wireless device in communication with a multi-antenna base station for radio alignment of downlink channels and uplink channels between the wireless device and the multi-antenna base station.

FIG. 15 illustrates a method performed by a wireless device in communication with a multi-antenna base station for radio alignment of downlink channels and uplink channels between the wireless device and the multi-antenna base station.

In step 1501, the method comprises transmitting uplink reference signals from an antenna in the wireless device to the multi-antenna base station, wherein the uplink reference signals are transmitted across multiple time instances. For example, as illustrated in FIG. 12, the uplink reference signals may comprise SRS.

In step 1502, the method comprises receiving downlink reference signals from the multi-antenna base station wherein the downlink reference signals are received over multiple time instances. For example, as illustrated in FIG. 13, the base station may transmit a set of DM-RS over the antennas of the array as the time slots progress.

In step 1503, the method comprises determining downlink channel data (also referred to as forward link channel data, e.g. in FIG. 13), wherein the downlink channel data comprises: estimates of a plurality of downlink channels associated with each of the downlink reference signals, and time synchronization information associated with each of the plurality of downlink channels.

For example, as illustrated in FIG. 13, the estimates of the plurality of downlink channels may comprise: estimates of a plurality of subset vector channels ($h_m^{(f,s)}$) each associated with a different time instance and estimates of a phase tracking channel ($h_m^{(f,p)}$) at each different time instance.

In some examples, the method further comprises obtaining the time synchronization information by time stamping each of the plurality of downlink channels upon reception of the respective downlink reference signals.

In some examples, the method further comprises obtaining the time synchronisation information by receiving a time stamp associated with each of the plurality of downlink reference signals.

In some examples, the method further comprises transmitting the downlink channel data to the multi-antenna base station. In some examples, the method comprises transmitting the downlink channel data to a network node.

Figure 16:
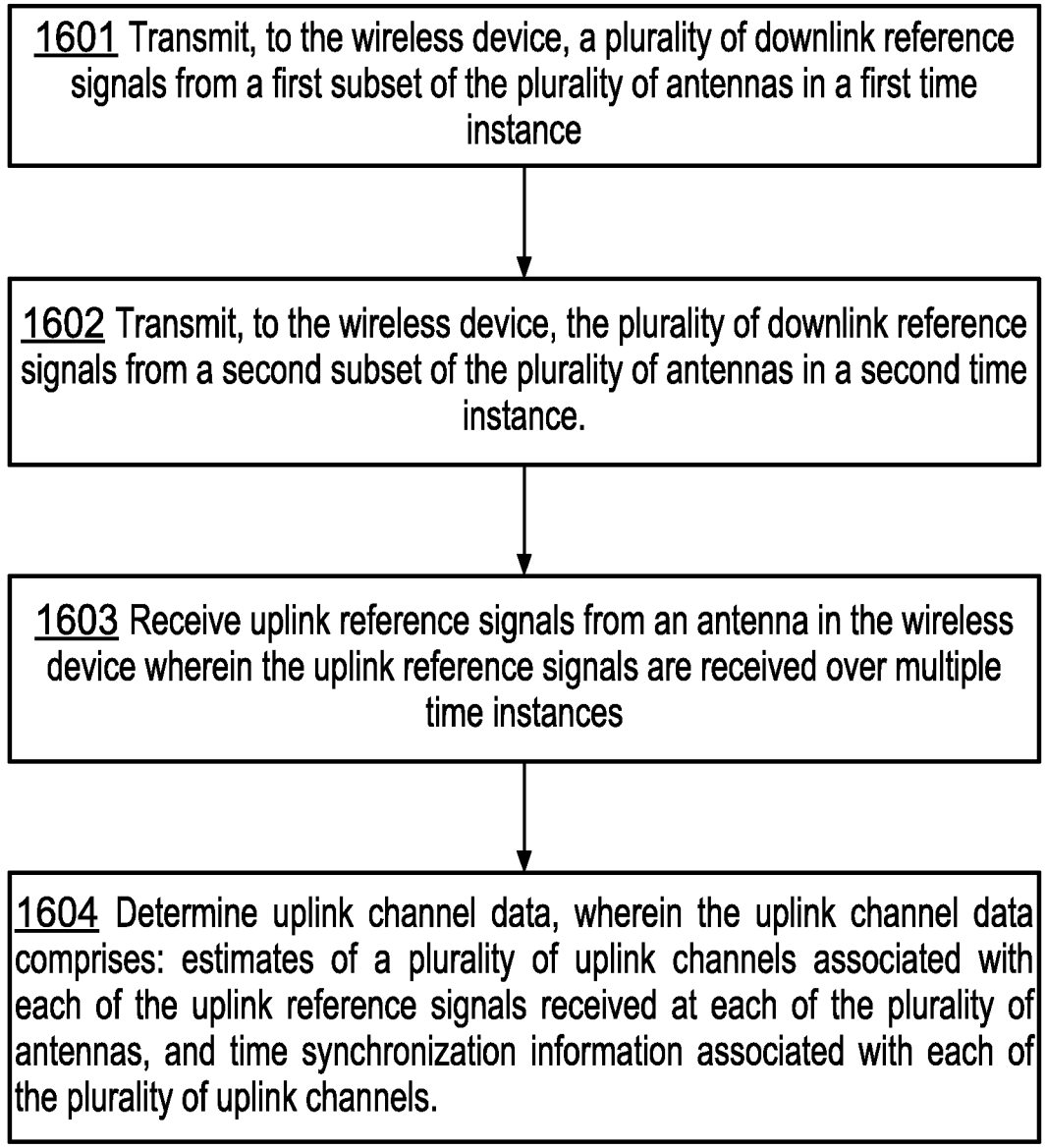
FIG. 16 illustrates a method performed by a multi-antenna base station comprising a plurality of antennas in communication with a wireless device for radio alignment of downlink channels and uplink channels between the wireless device and the multi-antenna base station.

FIG. 16 illustrates a method performed by a multi-antenna base station comprising a plurality of antennas in communication with a wireless device for radio alignment of downlink channels and uplink channels between the wireless device and the multi-antenna base station.

In step 1601, the method comprises transmitting, to the wireless device, a plurality of downlink reference signals from a first subset of the plurality of antennas in a first time instance.

In step 1602, the method comprises transmitting, to the wireless device, the plurality of downlink reference signals from a second subset of the plurality of antennas in a second time instance.

For example, as described with reference to FIG. 13 the base station may transmit DM-RS to the wireless device. For example, the number of DM-RS is usually less than the number of antennas N. To acquire the channels for all N antennas, the DM-RS in a time instance is transmitted from only a subset of the antennas. Within that subset, each DM-RS could have a one-to-one mapping to antennas (although other mappings would also be possible). The subset of antennas can then be altered during the progression of time slots.

In step 1603, the method comprises receiving uplink reference signals from an antenna in the wireless device wherein the uplink reference signals are received over multiple time instances (for example as illustrated in FIG. 12).

In step 1604, the method comprises determining uplink channel data (also referred to as reverse link channel data, e.g. in FIG. 12), wherein the uplink channel data comprises: estimates of a plurality of uplink channels associated with each of the uplink reference signals received at each of the plurality of antennas, and time synchronization information associated with each of the plurality of uplink channels.

In some examples, the method further comprises transmitting a phase tracking reference signal from a first antenna in the first time instance and in the second time instance. For example as described in FIG. 13, DM-RS 0 is transmitted over the phase tracking antenna in all time instances.

In some examples, the method further comprises obtaining the time synchronization information by time stamping each of the plurality of uplink channels upon reception of the respective uplink reference signals.

In some examples, the method comprises transmitting the uplink channel data to the wireless device. In some examples, the method comprises transmitting the uplink channel data to a network node.

Figure 17:
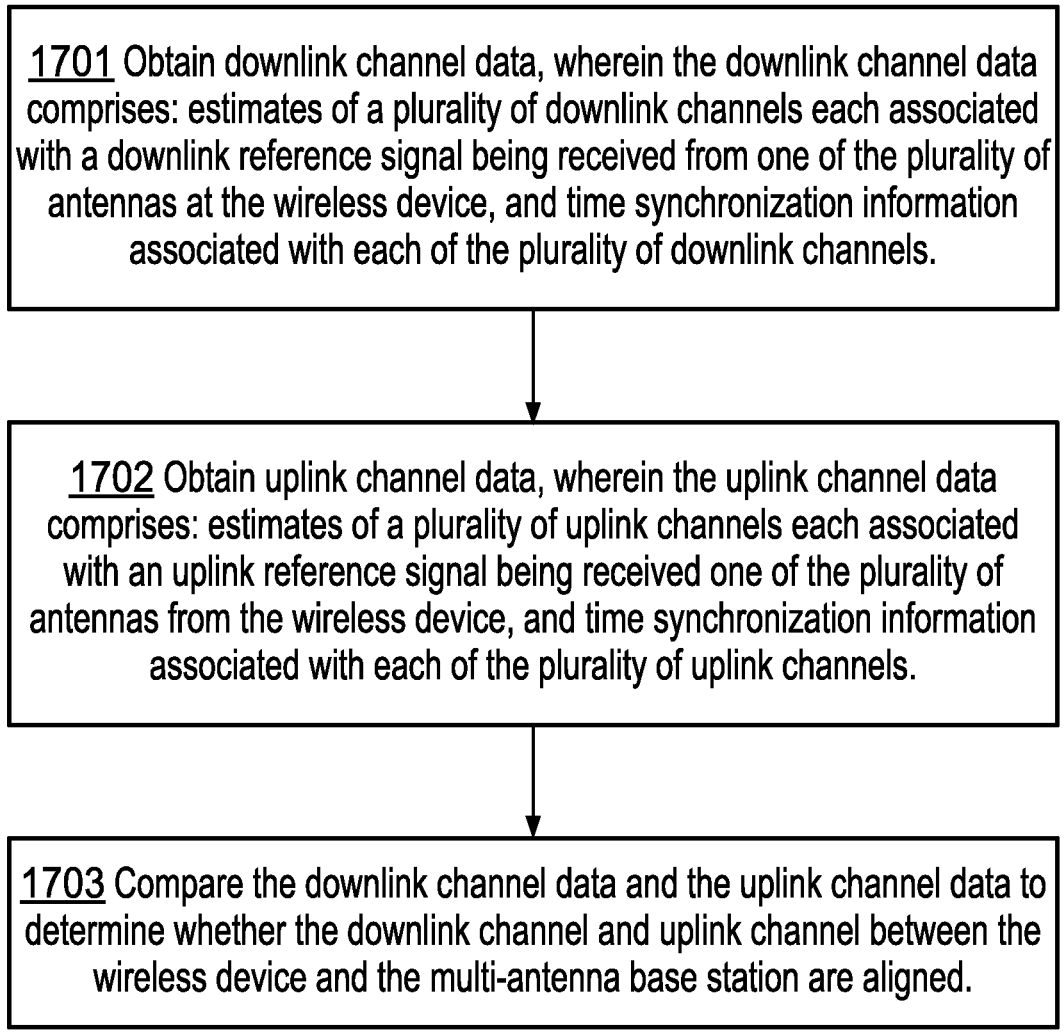
FIG. 17 illustrates a method in a network node for determining radio alignment of a full downlink channel and a full uplink channel between a wireless device and a multi-antenna base station comprising a plurality of antennas.

FIG. 17 illustrates a method in a network node for determining radio alignment of a full downlink channel and a full uplink channel between a wireless device and a multi-antenna base station comprising a plurality of antennas. For example, as described above, the processing of channel data, synchronization and comparison may be done outside the base station and measurement equipment (e.g. wireless device. For example, the reverse link channel data and the forward link channel data may be transmitted to a network node for comparison. In some examples, the network node comprises the wireless device or the base station.

In step 1701, the method comprises obtaining downlink channel data, wherein the downlink channel data comprises: estimates of a plurality of downlink channels each associated with a downlink reference signal being received from one of the plurality of antennas at the wireless device, and time synchronization information associated with each of the plurality of downlink channels.

In step 1702, the method comprises obtaining uplink channel data, wherein the uplink channel data comprises: estimates of a plurality of uplink channels each associated with an uplink reference signal being received one of the plurality of antennas from the wireless device, and time synchronization information associated with each of the plurality of uplink channels.

In step 1703, the method comprises comparing the downlink channel data and the uplink channel data to determine whether the downlink channel and uplink channel between the wireless device and the multi-antenna base station are aligned.

As previously described, the estimates of the plurality of downlink channels comprises: estimates of a plurality of subset vector channels each associated with a different time instance, $m_i$, and estimates of a phase tracking channel at each different time instance, $m_i$.

In some examples, the method further comprises selecting a first time instance, $m_1$.

Then, (as illustrated for example in step 1 of FIG. 14) for each of the plurality of subset vector channels associated with time instance $m_i$ determining the phase difference between the phase tracking channel at $m_i$ and the phase tracking channel at $m_1$; and de-rotating the subset vector channel by the phase difference to provide an estimate of the subset vector channel at time instance $m_i$.

The method may then further comprise (as illustrated for example in step 2 of FIG. 14) stacking the estimates of the plurality of subset vector channels at time instance $m_i$ on top of the estimate of the phase tracking channel at time instance $m_i$ to determine an estimate of a full downlink vector channel at time instance $m_2$.

As previously described, the estimates of the plurality of uplink channels may comprise an estimate of a full uplink vector channel at different time instances, $m_k$.

Step 1703 may therefore comprise comparing the estimate of the full downlink vector channel at time instance $m_2$ with the estimate of the full uplink vector channel at time instance $m_2$.

Figure 18:
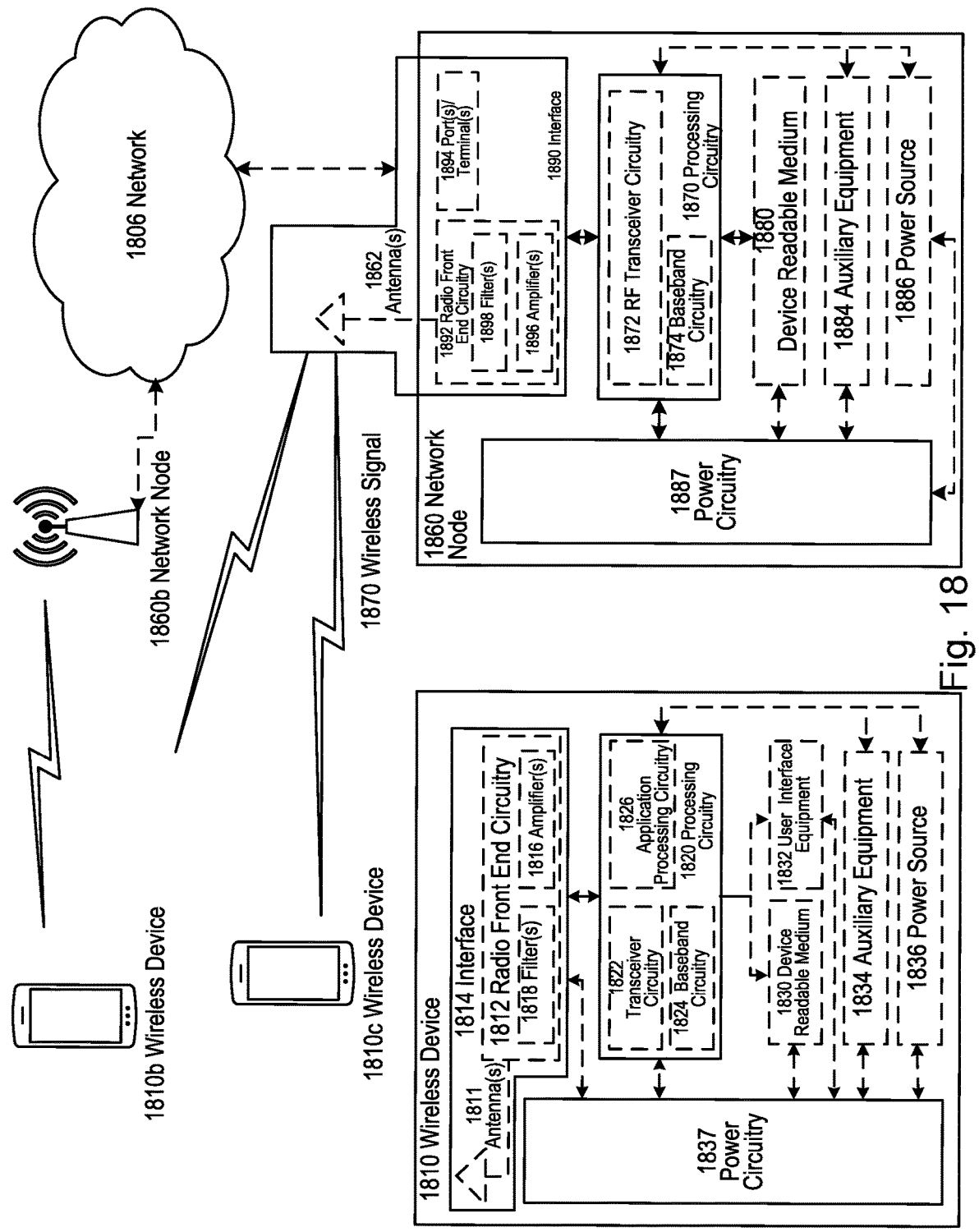
FIG. 18 illustrates a wireless network in accordance with some embodiments.

FIG. 18 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 18. For simplicity, the wireless network of FIG. 18 only depicts network 1806, network nodes 1860 and 1860*b*, and WDs 1810, 1810*b*, and 1810*c*. In practice, a wireless network may further include any additional elements suitable to support communication between wireless devices or between a wireless device and another communication device, such as a landline telephone, a service provider, or any other network node or end device. Of the illustrated components, network node 1860 and wireless device (WD) 1810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1860 and WD 1810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 1860 includes processing circuitry 1870, device readable medium 1880, interface 1890, auxiliary equipment 1884, power source 1886, power circuitry 1887, and antenna 1862. Although network node 1860 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1860 are depicted as single boxes located within a larger box, or nested within multiple boxes, in practice, a network node may comprise multiple different physical components that make up a single illustrated component (e.g., device readable medium 1880 may comprise multiple separate hard drives as well as multiple RAM modules).

Similarly, network node 1860 may be composed of multiple physically separate components (e.g., a NodeB component and a RNC component, or a BTS component and a BSC component, etc.), which may each have their own respective components. In certain scenarios in which network node 1860 comprises multiple separate components (e.g., BTS and BSC components), one or more of the separate components may be shared among several network nodes. For example, a single RNC may control multiple NodeB's. In such a scenario, each unique NodeB and RNC pair may in some instances be considered a single separate network node. In some embodiments, network node 1860 may be configured to support multiple radio access technologies (RATs). In such embodiments, some components may be duplicated (e.g., separate device readable medium 1880 for the different RATs) and some components may be reused (e.g., the same antenna 1862 may be shared by the RATs). Network node 1860 may also include multiple sets of the various illustrated components for different wireless technologies integrated into network node 1860, such as, for example, GSM, WCDMA, LTE, NR, WiFi, or Bluetooth wireless technologies. These wireless technologies may be integrated into the same or different chip or set of chips and other components within network node 1860.

Processing circuitry 1870 is configured to perform any determining, calculating, or similar operations (e.g., certain obtaining operations) described herein as being provided by a network node. These operations performed by processing circuitry 1870 may include processing information obtained by processing circuitry 1870 by, for example, converting the obtained information into other information, comparing the obtained information or converted information to information stored in the network node, and/or performing one or more operations based on the obtained information or converted information, and as a result of said processing making a determination.

Processing circuitry 1870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1860 components, such as device readable medium 1880, network node 1860 functionality. For example, processing circuitry 1870 may execute instructions stored in device readable medium 1880 or in memory within processing circuitry 1870. Such functionality may include providing any of the various wireless features, functions, or benefits discussed herein. In some embodiments, processing circuitry 1870 may include a system on a chip (SOC).

In some embodiments, processing circuitry 1870 may include one or more of radio frequency (RF) transceiver circuitry 1872 and baseband processing circuitry 1874. In some embodiments, radio frequency (RF) transceiver circuitry 1872 and baseband processing circuitry 1874 may be on separate chips (or sets of chips), boards, or units, such as radio units and digital units. In alternative embodiments, part or all of RF transceiver circuitry 1872 and baseband processing circuitry 1874 may be on the same chip or set of chips, boards, or units In certain embodiments, some or all of the functionality described herein as being provided by a network node, base station, eNB or other such network device may be performed by processing circuitry 1870 executing instructions stored on device readable medium 1880 or memory within processing circuitry 1870. In alternative embodiments, some or all of the functionality may be provided by processing circuitry 1870 without executing instructions stored on a separate or discrete device readable medium, such as in a hard-wired manner. In any of those embodiments, whether executing instructions stored on a device readable storage medium or not, processing circuitry 1870 can be configured to perform the described functionality. The benefits provided by such functionality are not limited to processing circuitry 1870 alone or to other components of network node 1860, but are enjoyed by network node 1860 as a whole, and/or by end users and the wireless network generally.

Device readable medium 1880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1870. Device readable medium 1880 may store any suitable instructions, data or information, including a computer program, software, an application including one or more of logic, rules, code, tables, etc. and/or other instructions capable of being executed by processing circuitry 1870 and, utilized by network node 1860. Device readable medium 1880 may be used to store any calculations made by processing circuitry 1870 and/or any data received via interface 1890. In some embodiments, processing circuitry 1870 and device readable medium 1880 may be considered to be integrated.

Interface 1890 is used in the wired or wireless communication of signalling and/or data between network node 1860, network 1806, and/or WDs 1810. As illustrated, interface 1890 comprises port(s)/terminal(s) 1894 to send and receive data, for example to and from network 1806 over a wired connection. Interface 1890 also includes radio front end circuitry 1892 that may be coupled to, or in certain embodiments a part of, antenna 1862. Radio front end circuitry 1892 comprises filters 1898 and amplifiers 1896. Radio front end circuitry 1892 may be connected to antenna 1862 and processing circuitry 1870. Radio front end circuitry may be configured to condition signals communicated between antenna 1862 and processing circuitry 1870. Radio front end circuitry 1892 may receive digital data that is to be sent out to other network nodes or WDs via a wireless connection. Radio front end circuitry 1892 may convert the digital data into a radio signal having the appropriate channel and bandwidth parameters using a combination of filters 1898 and/or amplifiers 1896. The radio signal may then be transmitted via antenna 1862. Similarly, when receiving data, antenna 1862 may collect radio signals which are then converted into digital data by radio front end circuitry 1892. The digital data may be passed to processing circuitry 1870. In other embodiments, the interface may comprise different components and/or different combinations of components.

In certain alternative embodiments, network node 1860 may not include separate radio front end circuitry 1892, instead, processing circuitry 1870 may comprise radio front end circuitry and may be connected to antenna 1862 without separate radio front end circuitry 1892. Similarly, in some embodiments, all or some of RF transceiver circuitry 1872 may be considered a part of interface 1890. In still other embodiments, interface 1890 may include one or more ports or terminals 1894, radio front end circuitry 1892, and RF transceiver circuitry 1872, as part of a radio unit (not shown), and interface 1890 may communicate with baseband processing circuitry 1874, which is part of a digital unit (not shown).

Antenna 1862 may include one or more antennas, or antenna arrays, configured to send and/or receive wireless signals. Antenna 1862 may be coupled to radio front end circuitry 1890 and may be any type of antenna capable of transmitting and receiving data and/or signals wirelessly. In some embodiments, antenna 1862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1862 may be separate from network node 1860 and may be connectable to network node 1860 through an interface or port.

Antenna 1862, interface 1890, and/or processing circuitry 1870 may be configured to perform any receiving operations and/or certain obtaining operations described herein as being performed by a network node. Any information, data and/or signals may be received from a wireless device, another network node and/or any other network equipment. Similarly, antenna 1862, interface 1890, and/or processing circuitry 1870 may be configured to perform any transmitting operations described herein as being performed by a network node. Any information, data and/or signals may be transmitted to a wireless device, another network node and/or any other network equipment.

Power circuitry 1887 may comprise, or be coupled to, power management circuitry and is configured to supply the components of network node 1860 with power for performing the functionality described herein. Power circuitry 1887 may receive power from power source 1886. Power source 1886 and/or power circuitry 1887 may be configured to provide power to the various components of network node 1860 in a form suitable for the respective components (e.g., at a voltage and current level needed for each respective component). Power source 1886 may either be included in, or external to, power circuitry 1887 and/or network node 1860. For example, network node 1860 may be connectable to an external power source (e.g., an electricity outlet) via an input circuitry or interface such as an electrical cable, whereby the external power source supplies power to power circuitry 1887. As a further example, power source 1886 may comprise a source of power in the form of a battery or battery pack which is connected to, or integrated in, power circuitry 1887. The battery may provide backup power should the external power source fail. Other types of power sources, such as photovoltaic devices, may also be used.

Alternative embodiments of network node 1860 may include additional components beyond those shown in FIG. 18 that may be responsible for providing certain aspects of the network node's functionality, including any of the functionality described herein and/or any functionality necessary to support the subject matter described herein. For example, network node 1860 may include user interface equipment to allow input of information into network node 1860 and to allow output of information from network node 1860. This may allow a user to perform diagnostic, maintenance, repair, and other administrative functions for network node 1860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1810 includes antenna 1811, interface 1814, processing circuitry 1820, device readable medium 1830, user interface equipment 1832, auxiliary equipment 1834, power source 1836 and power circuitry 1837. WD 1810 may include multiple sets of one or more of the illustrated components for different wireless technologies supported by WD 1810, such as, for example, GSM, WCDMA, LTE, NR, WiFi, WiMAX, or Bluetooth wireless technologies, just to mention a few. These wireless technologies may be integrated into the same or different chips or set of chips as other components within WD 1810.

Antenna 1811 may include one or more antennas or antenna arrays, configured to send and/or receive wireless signals, and is connected to interface 1814. In certain alternative embodiments, antenna 1811 may be separate from WD 1810 and be connectable to WD 1810 through an interface or port. Antenna 1811, interface 1814, and/or processing circuitry 1820 may be configured to perform any receiving or transmitting operations described herein as being performed by a WD. Any information, data and/or signals may be received from a network node and/or another WD. In some embodiments, radio front end circuitry and/or antenna 1811 may be considered an interface.

As illustrated, interface 1814 comprises radio front end circuitry 1812 and antenna 1811. Radio front end circuitry 1812 comprise one or more filters 1818 and amplifiers 1816. Radio front end circuitry 1814 is connected to antenna 1811 and processing circuitry 1820, and is configured to condition signals communicated between antenna 1811 and processing circuitry 1820. Radio front end circuitry 1812 may be coupled to or a part of antenna 1811. In some embodiments, WD 1810 may not include separate radio front end circuitry 1812; rather, processing circuitry 1820 may comprise radio front end circuitry and may be connected to antenna 1811. Similarly, in some embodiments, some or all of RF transceiver circuitry 1822 may be considered a part of interface 1814. Radio front end circuitry 1812 may receive digital data that is to be sent out to other network nodes or WDs via a wireless connection. Radio front end circuitry 1812 may convert the digital data into a radio signal having the appropriate channel and bandwidth parameters using a combination of filters 1818 and/or amplifiers 1816. The radio signal may then be transmitted via antenna 1811. Similarly, when receiving data, antenna 1811 may collect radio signals which are then converted into digital data by radio front end circuitry 1812. The digital data may be passed to processing circuitry 1820. In other embodiments, the interface may comprise different components and/or different combinations of components.

Processing circuitry 1820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1810 components, such as device readable medium 1830, WD 1810 functionality. Such functionality may include providing any of the various wireless features or benefits discussed herein. For example, processing circuitry 1820 may execute instructions stored in device readable medium 1830 or in memory within processing circuitry 1820 to provide the functionality disclosed herein.

As illustrated, processing circuitry 1820 includes one or more of RF transceiver circuitry 1822, baseband processing circuitry 1824, and application processing circuitry 1826. In other embodiments, the processing circuitry may comprise different components and/or different combinations of components. In certain embodiments processing circuitry 1820 of WD 1810 may comprise a SOC. In some embodiments, RF transceiver circuitry 1822, baseband processing circuitry 1824, and application processing circuitry 1826 may be on separate chips or sets of chips. In alternative embodiments, part or all of baseband processing circuitry 1824 and application processing circuitry 1826 may be combined into one chip or set of chips, and RF transceiver circuitry 1822 may be on a separate chip or set of chips. In still alternative embodiments, part or all of RF transceiver circuitry 1822 and baseband processing circuitry 1824 may be on the same chip or set of chips, and application processing circuitry 1826 may be on a separate chip or set of chips. In yet other alternative embodiments, part or all of RF transceiver circuitry 1822, baseband processing circuitry 1824, and application processing circuitry 1826 may be combined in the same chip or set of chips. In some embodiments, RF transceiver circuitry 1822 may be a part of interface 1814. RF transceiver circuitry 1822 may condition RF signals for processing circuitry 1820.

In certain embodiments, some or all of the functionality described herein as being performed by a WD may be provided by processing circuitry 1820 executing instructions stored on device readable medium 1830, which in certain embodiments may be a computer-readable storage medium. In alternative embodiments, some or all of the functionality may be provided by processing circuitry 1820 without executing instructions stored on a separate or discrete device readable storage medium, such as in a hard-wired manner. In any of those particular embodiments, whether executing instructions stored on a device readable storage medium or not, processing circuitry 1820 can be configured to perform the described functionality. The benefits provided by such functionality are not limited to processing circuitry 1820 alone or to other components of WD 1810, but are enjoyed by WD 1810 as a whole, and/or by end users and the wireless network generally.

Processing circuitry 1820 may be configured to perform any determining, calculating, or similar operations (e.g., certain obtaining operations) described herein as being performed by a WD. These operations, as performed by processing circuitry 1820, may include processing information obtained by processing circuitry 1820 by, for example, converting the obtained information into other information, comparing the obtained information or converted information to information stored by WD 1810, and/or performing one or more operations based on the obtained information or converted information, and as a result of said processing making a determination.

Device readable medium 1830 may be operable to store a computer program, software, an application including one or more of logic, rules, code, tables, etc. and/or other instructions capable of being executed by processing circuitry 1820. Device readable medium 1830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1820. In some embodiments, processing circuitry 1820 and device readable medium 1830 may be considered to be integrated.

User interface equipment 1832 may provide components that allow for a human user to interact with WD 1810. Such interaction may be of many forms, such as visual, audial, tactile, etc. User interface equipment 1832 may be operable to produce output to the user and to allow the user to provide input to WD 1810. The type of interaction may vary depending on the type of user interface equipment 1832 installed in WD 1810. For example, if WD 1810 is a smart phone, the interaction may be via a touch screen; if WD 1810 is a smart meter, the interaction may be through a screen that provides usage (e.g., the number of gallons used) or a speaker that provides an audible alert (e.g., if smoke is detected). User interface equipment 1832 may include input interfaces, devices and circuits, and output interfaces, devices and circuits. User interface equipment 1832 is configured to allow input of information into WD 1810, and is connected to processing circuitry 1820 to allow processing circuitry 1820 to process the input information. User interface equipment 1832 may include, for example, a microphone, a proximity or other sensor, keys/buttons, a touch display, one or more cameras, a USB port, or other input circuitry. User interface equipment 1832 is also configured to allow output of information from WD 1810, and to allow processing circuitry 1820 to output information from WD 1810. User interface equipment 1832 may include, for example, a speaker, a display, vibrating circuitry, a USB port, a headphone interface, or other output circuitry. Using one or more input and output interfaces, devices, and circuits, of user interface equipment 1832, WD 1810 may communicate with end users and/or the wireless network, and allow them to benefit from the functionality described herein.

Auxiliary equipment 1834 is operable to provide more specific functionality which may not be generally performed by WDs. This may comprise specialized sensors for doing measurements for various purposes, interfaces for additional types of communication such as wired communications etc. The inclusion and type of components of auxiliary equipment 1834 may vary depending on the embodiment and/or scenario.

Power source 1836 may, in some embodiments, be in the form of a battery or battery pack. Other types of power sources, such as an external power source (e.g., an electricity outlet), photovoltaic devices or power cells, may also be used. WD 1810 may further comprise power circuitry 1837 for delivering power from power source 1836 to the various parts of WD 1810 which need power from power source 1836 to carry out any functionality described or indicated herein. Power circuitry 1837 may in certain embodiments comprise power management circuitry. Power circuitry 1837 may additionally or alternatively be operable to receive power from an external power source; in which case WD 1810 may be connectable to the external power source (such as an electricity outlet) via input circuitry or an interface such as an electrical power cable. Power circuitry 1837 may also in certain embodiments be operable to deliver power from an external power source to power source 1836. This may be, for example, for the charging of power source 1836. Power circuitry 1837 may perform any formatting, converting, or other modification to the power from power source 1836 to make the power suitable for the respective components of WD 1810 to which power is supplied.

Figure 19:
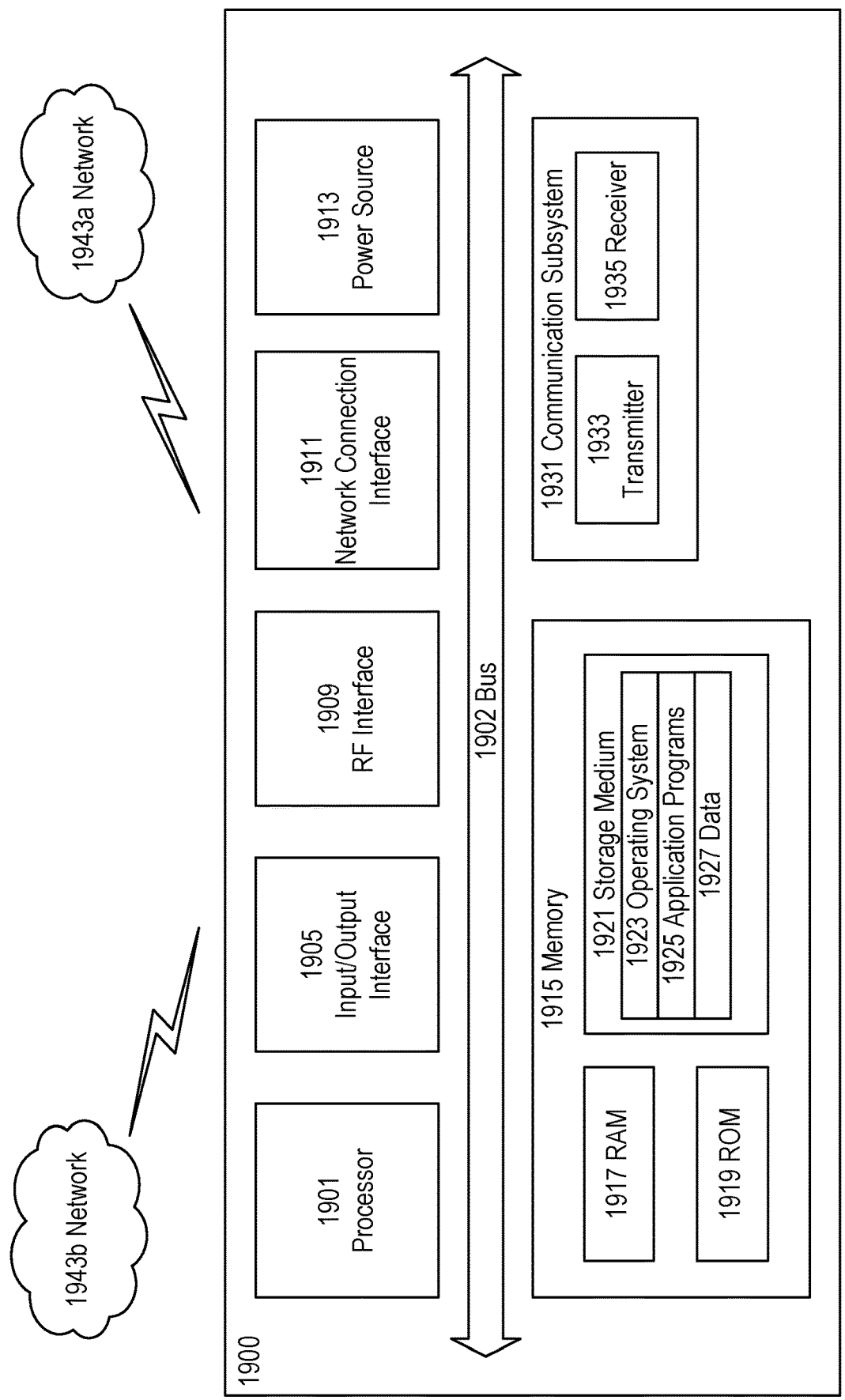
FIG. 19 illustrates a User Equipment in accordance with some embodiments.

FIG. 19 illustrates a User Equipment in accordance with some embodiments

FIG. 19 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 19200 may be any UE identified by the $3^{rd}$ Generation Partnership Project (3GPP), including a NB-IoT UE, a machine type communication (MTC) UE, and/or an enhanced MTC (eMTC) UE. UE 1900, as illustrated in FIG. 19, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 19 is a UE, the components discussed herein are equally applicable to a WD, and vice-versa.

In FIG. 19, UE 1900 includes processing circuitry 1901 that is operatively coupled to input/output interface 1905, radio frequency (RF) interface 1909, network connection interface 1911, memory 1915 including random access memory (RAM) 1917, read-only memory (ROM) 1919, and storage medium 1921 or the like, communication subsystem 1931, power source 1933, and/or any other component, or any combination thereof. Storage medium 1921 includes operating system 1923, application program 1925, and data 1927. In other embodiments, storage medium 1921 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 1901 may be configured to process computer instructions and data. Processing circuitry 1901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1901 may include two central processing units (CPUs). Data may be information in a form suitable for use by a computer.

In the depicted embodiment, input/output interface 1905 may be configured to provide a communication interface to an input device, output device, or input and output device. UE 1900 may be configured to use an output device via input/output interface 1905. An output device may use the same type of interface port as an input device. For example, a USB port may be used to provide input to and output from UE 1900. The output device may be a speaker, a sound card, a video card, a display, a monitor, a printer, an actuator, an emitter, a smartcard, another output device, or any combination thereof. UE 1900 may be configured to use an input device via input/output interface 1905 to allow a user to capture information into UE 1900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 1909 may be configured to provide a communication interface to RF components such as a transmitter, a receiver, and an antenna. Network connection interface 1911 may be configured to provide a communication interface to network 1943a. Network 1943a may encompass wired and/or wireless networks such as a local-area network (LAN), a wide-area network (WAN), a computer network, a wireless network, a telecommunications network, another like network or any combination thereof. For example, network 1943a may comprise a Wi-Fi network. Network connection interface 1911 may be configured to include a receiver and a transmitter interface used to communicate with one or more other devices over a communication network according to one or more communication protocols, such as Ethernet, TCP/IP, SONET, ATM, or the like. Network connection interface 1911 may implement receiver and transmitter functionality appropriate to the communication network links (e.g., optical, electrical, and the like). The transmitter and receiver functions may share circuit components, software or firmware, or alternatively may be implemented separately.

RAM 1917 may be configured to interface via bus 1902 to processing circuitry 1901 to provide storage or caching of data or computer instructions during the execution of software programs such as the operating system, application programs, and device drivers. ROM 1919 may be configured to provide computer instructions or data to processing circuitry 1901. For example, ROM 1919 may be configured to store invariant low-level system code or data for basic system functions such as basic input and output (I/O), startup, or reception of keystrokes from a keyboard that are stored in a non-volatile memory. Storage medium 1921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1921 may be configured to include operating system 1923, application program 1925 such as a web browser application, a widget or gadget engine or another application, and data file 1927. Storage medium 1921 may store, for use by UE 1900, any of a variety of various operating systems or combinations of operating systems.

Storage medium 1921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1921 may allow UE 1900 to access computer-executable instructions, application programs or the like, stored on transitory or non-transitory memory media, to off-load data, or to upload data. An article of manufacture, such as one utilizing a communication system may be tangibly embodied in storage medium 1921, which may comprise a device readable medium.

In FIG. 19, processing circuitry 1901 may be configured to communicate with network 1943b using communication subsystem 1931. Network 1943a and network 1943b may be the same network or networks or different network or networks. Communication subsystem 1931 may be configured to include one or more transceivers used to communicate with network 1943b. For example, communication subsystem 1931 may be configured to include one or more transceivers used to communicate with one or more remote transceivers of another device capable of wireless communication such as another WD, UE, or base station of a radio access network (RAN) according to one or more communication protocols, such as IEEE 802.19, CDMA, WCDMA, GSM, LTE, UTRAN, WiMax, or the like. Each transceiver may include transmitter 1933 and/or receiver 1935 to implement transmitter or receiver functionality, respectively, appropriate to the RAN links (e.g., frequency allocations and the like). Further, transmitter 1933 and receiver 1935 of each transceiver may share circuit components, software or firmware, or alternatively may be implemented separately.

In the illustrated embodiment, the communication functions of communication subsystem 1931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1931 may include cellular communication, Wi-Fi communication, Bluetooth communication, and GPS communication. Network 1943b may encompass wired and/or wireless networks such as a local-area network (LAN), a wide-area network (WAN), a computer network, a wireless network, a telecommunications network, another like network or any combination thereof. For example, network 1943b may be a cellular network, a Wi-Fi network, and/or a near-field network. Power source 1913 may be configured to provide alternating current (AC) or direct current (DC) power to components of UE 1900.

The features, benefits and/or functions described herein may be implemented in one of the components of UE 1900 or partitioned across multiple components of UE 1900. Further, the features, benefits, and/or functions described herein may be implemented in any combination of hardware, software or firmware. In one example, communication subsystem 1931 may be configured to include any of the components described herein. Further, processing circuitry 1901 may be configured to communicate with any of such components over bus 1902. In another example, any of such components may be represented by program instructions stored in memory that when executed by processing circuitry 1901 perform the corresponding functions described herein. In another example, the functionality of any of such components may be partitioned between processing circuitry 1901 and communication subsystem 1931. In another example, the non-computationally intensive functions of any of such components may be implemented in software or firmware and the computationally intensive functions may be implemented in hardware.

Figure 20:
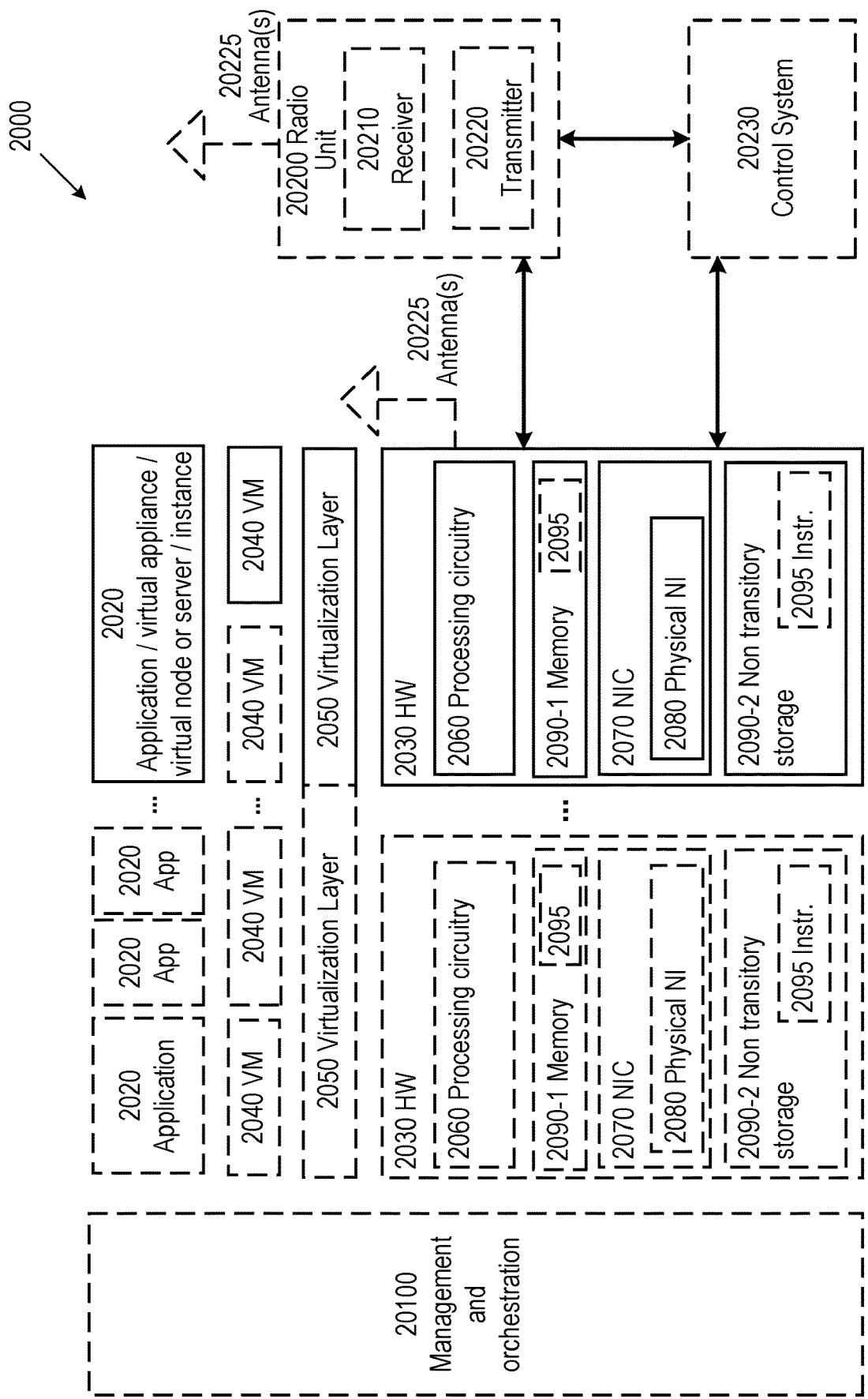
FIG. 20 illustrates a Virtualization environment in accordance with some embodiments.

FIG. 20 illustrates a Virtualization environment in accordance with some embodiments.

FIG. 20 is a schematic block diagram illustrating a virtualization environment 2000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2000 hosted by one or more of hardware nodes 2030. Further, in embodiments in which the virtual node is not a radio access node or does not require radio connectivity (e.g., a core network node), then the network node may be entirely virtualized.

The functions may be implemented by one or more applications 2020 (which may alternatively be called software instances, virtual appliances, network functions, virtual nodes, virtual network functions, etc.) operative to implement some of the features, functions, and/or benefits of some of the embodiments disclosed herein. Applications 2020 are run in virtualization environment 2000 which provides hardware 2030 comprising processing circuitry 2060 and memory 2090. Memory 2090 contains instructions 2095 executable by processing circuitry 2060 whereby application 2020 is operative to provide one or more of the features, benefits, and/or functions disclosed herein.

Virtualization environment 2000, comprises general-purpose or special-purpose network hardware devices 2030 comprising a set of one or more processors or processing circuitry 2060, which may be commercial off-the-shelf (COTS) processors, dedicated Application Specific Integrated Circuits (ASICs), or any other type of processing circuitry including digital or analog hardware components or special purpose processors. Each hardware device may comprise memory 2090-1 which may be non-persistent memory for temporarily storing instructions 2095 or software executed by processing circuitry 2060. Each hardware device may comprise one or more network interface controllers (NICs) 2070, also known as network interface cards, which include physical network interface 2080. Each hardware device may also include non-transitory, persistent, machine-readable storage media 2090-2 having stored therein software 2095 and/or instructions executable by processing circuitry 2060. Software 2095 may include any type of software including software for instantiating one or more virtualization layers 2050 (also referred to as hypervisors), software to execute virtual machines 2040 as well as software allowing it to execute functions, features and/or benefits described in relation with some embodiments described herein.

Virtual machines 2040, comprise virtual processing, virtual memory, virtual networking or interface and virtual storage, and may be run by a corresponding virtualization layer 2050 or hypervisor. Different embodiments of the instance of virtual appliance 2020 may be implemented on one or more of virtual machines 2040, and the implementations may be made in different ways.

During operation, processing circuitry 2060 executes software 2095 to instantiate the hypervisor or virtualization layer 2050, which may sometimes be referred to as a virtual machine monitor (VMM). Virtualization layer 2050 may present a virtual operating platform that appears like networking hardware to virtual machine 2040.

As shown in FIG. 20, hardware 2030 may be a standalone network node with generic or specific components. Hardware 2030 may comprise antenna 20225 and may implement some functions via virtualization. Alternatively, hardware 2030 may be part of a larger cluster of hardware (e.g. such as in a data center or customer premise equipment (CPE)) where many hardware nodes work together and are managed via management and orchestration (MANO) 20100, which, among others, oversees lifecycle management of applications 2020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2040 may be a software implementation of a physical machine that runs programs as if they were executing on a physical, non-virtualized machine. Each of virtual machines 2040, and that part of hardware 2030 that executes that virtual machine, be it hardware dedicated to that virtual machine and/or hardware shared by that virtual machine with others of the virtual machines 2040, forms a separate virtual network elements (VNE).

Still in the context of NFV, Virtual Network Function (VNF) is responsible for handling specific network functions that run in one or more virtual machines 2040 on top of hardware networking infrastructure 2030 and corresponds to application 2020 in FIG. 20.

In some embodiments, one or more radio units 20200 that each include one or more transmitters 20220 and one or more receivers 20210 may be coupled to one or more antennas 20225. Radio units 20200 may communicate directly with hardware nodes 2030 via one or more appropriate network interfaces and may be used in combination with the virtual components to provide a virtual node with radio capabilities, such as a radio access node or a base station.

In some embodiments, some signalling can be effected with the use of control system 20230 which may alternatively be used for communication between the hardware nodes 2030 and radio units 20200.

Figure 21:
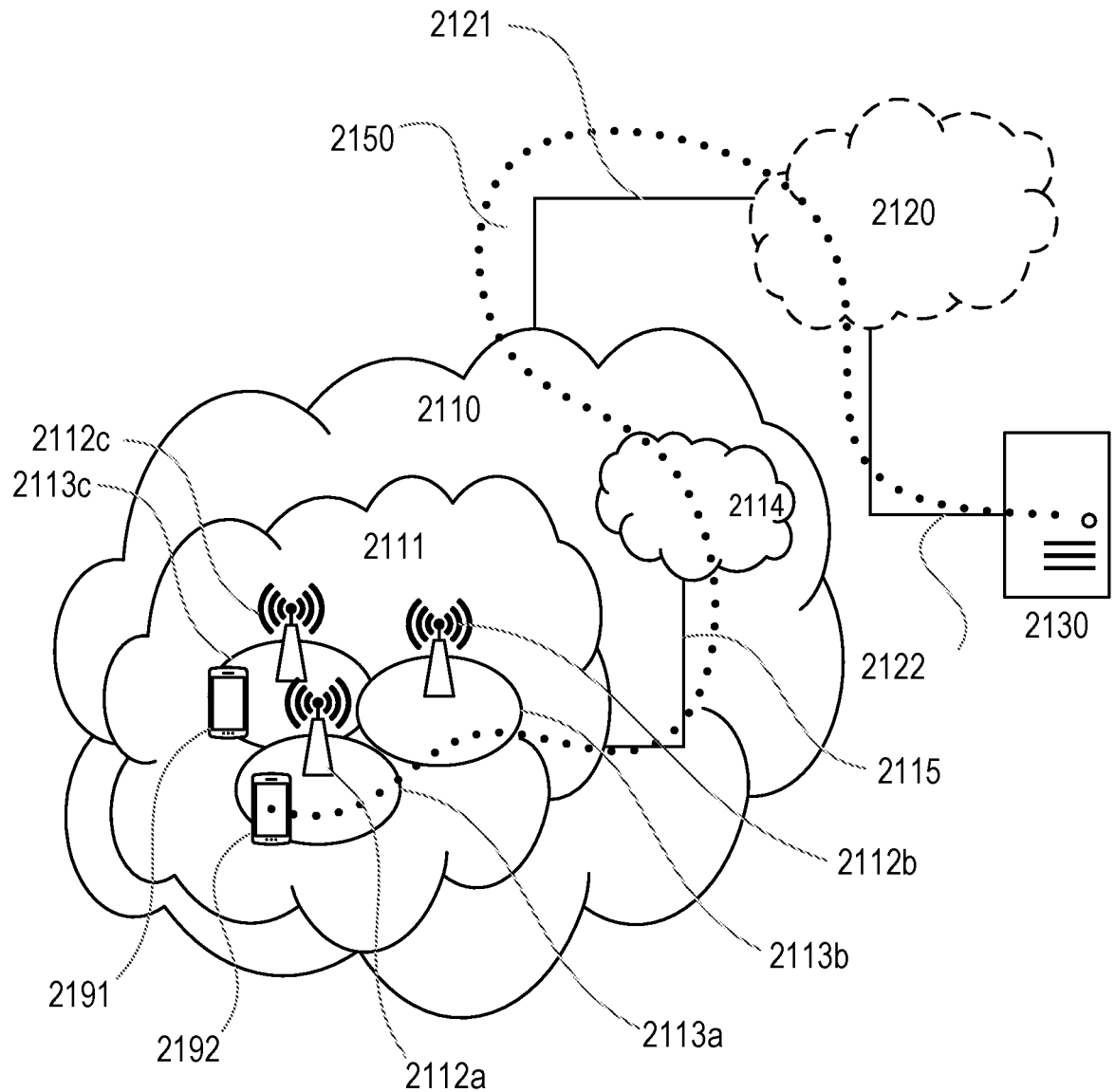
FIG. 21 illustrates a telecommunication network connected via an intermediate network to a host computer in accordance with some embodiments.

FIG. 21 illustrates a telecommunication network connected via an intermediate network to a host computer in accordance with some embodiments.

With reference to FIG. 21, in accordance with an embodiment, a communication system includes telecommunication network 2110, such as a 3GPP-type cellular network, which comprises access network 2111, such as a radio access network, and core network 2114. Access network 2111 comprises a plurality of base stations 2112a, 2112b, 2112c, such as NBs, eNBs, gNBs or other types of wireless access points, each defining a corresponding coverage area 2113a, 2113b, 2113c. Each base station 2112a, 2112b, 2112c is connectable to core network 2114 over a wired or wireless connection 2115. A first UE 2191 located in coverage area 2113c is configured to wirelessly connect to, or be paged by, the corresponding base station 2112c. A second UE 2192 in coverage area 2113a is wirelessly connectable to the corresponding base station 2112a. While a plurality of UEs 2191, 2192 are illustrated in this example, the disclosed embodiments are equally applicable to a situation where a sole UE is in the coverage area or where a sole UE is connecting to the corresponding base station 2112.

Telecommunication network 2110 is itself connected to host computer 2130, which may be embodied in the hardware and/or software of a standalone server, a cloud-implemented server, a distributed server or as processing resources in a server farm. Host computer 2130 may be under the ownership or control of a service provider, or may be operated by the service provider or on behalf of the service provider. Connections 2121 and 2122 between telecommunication network 2110 and host computer 2130 may extend directly from core network 2114 to host computer 2130 or may go via an optional intermediate network 2120. Intermediate network 2120 may be one of, or a combination of more than one of, a public, private or hosted network; intermediate network 2120, if any, may be a backbone network or the Internet; in particular, intermediate network 2120 may comprise two or more sub-networks (not shown).

The communication system of FIG. 21 as a whole enables connectivity between the connected UEs 2191, 2192 and host computer 2130. The connectivity may be described as an over-the-top (OTT) connection 2150. Host computer 2130 and the connected UEs 2191, 2192 are configured to communicate data and/or signaling via OTT connection 2150, using access network 2111, core network 2114, any intermediate network 2120 and possible further infrastructure (not shown) as intermediaries. OTT connection 2150 may be transparent in the sense that the participating communication devices through which OTT connection 2150 passes are unaware of routing of uplink and downlink communications. For example, base station 2112 may not or need not be informed about the past routing of an incoming downlink communication with data originating from host computer 2130 to be forwarded (e.g., handed over) to a connected UE 2191. Similarly, base station 2112 need not be aware of the future routing of an outgoing uplink communication originating from the UE 2191 towards the host computer 2130.

Figure 22:
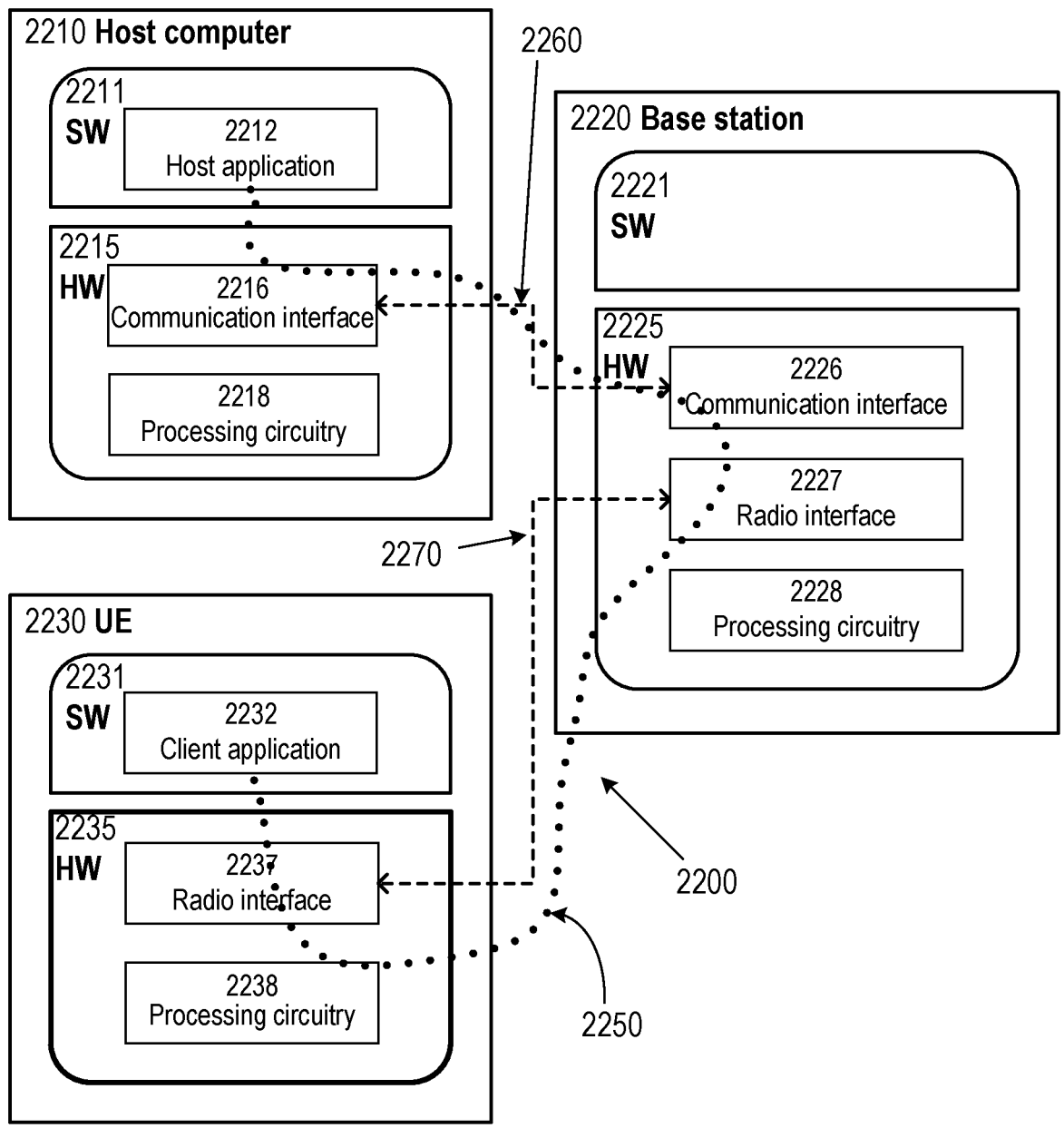
FIG. 22 illustrates a host computer communicating via a base station with a user equipment over a partially wireless connection in accordance with some embodiments.

FIG. 22 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 22. In communication system 2200, host computer 2210 comprises hardware 2215 including communication interface 2216 configured to set up and maintain a wired or wireless connection with an interface of a different communication device of communication system 2200. Host computer 2210 further comprises processing circuitry 2218, which may have storage and/or processing capabilities. In particular, processing circuitry 2218 may comprise one or more programmable processors, application-specific integrated circuits, field programmable gate arrays or combinations of these (not shown) adapted to execute instructions. Host computer 2210 further comprises software 2211, which is stored in or accessible by host computer 2210 and executable by processing circuitry 2218. Software 2211 includes host application 2212. Host application 2212 may be operable to provide a service to a remote user, such as UE 2230 connecting via OTT connection 2250 terminating at UE 2230 and host computer 2210. In providing the service to the remote user, host application 2212 may provide user data which is transmitted using OTT connection 2250.

Communication system 2200 further includes base station 2220 provided in a telecommunication system and comprising hardware 2225 enabling it to communicate with host computer 2210 and with UE 2230. Hardware 2225 may include communication interface 2226 for setting up and maintaining a wired or wireless connection with an interface of a different communication device of communication system 2200, as well as radio interface 2227 for setting up and maintaining at least wireless connection 2270 with UE 2230 located in a coverage area (not shown in FIG. 22) served by base station 2220. Communication interface 2226 may be configured to facilitate connection 2260 to host computer 2210. Connection 2260 may be direct or it may pass through a core network (not shown in FIG. 22) of the telecommunication system and/or through one or more intermediate networks outside the telecommunication system. In the embodiment shown, hardware 2225 of base station 2220 further includes processing circuitry 2228, which may comprise one or more programmable processors, application-specific integrated circuits, field programmable gate arrays or combinations of these (not shown) adapted to execute instructions. Base station 2220 further has software 2221 stored internally or accessible via an external connection.

Communication system 2200 further includes UE 2230 already referred to. Its hardware 2235 may include radio interface 2237 configured to set up and maintain wireless connection 2270 with a base station serving a coverage area in which UE 2230 is currently located. Hardware 2235 of UE 2230 further includes processing circuitry 2238, which may comprise one or more programmable processors, application-specific integrated circuits, field programmable gate arrays or combinations of these (not shown) adapted to execute instructions. UE 2230 further comprises software 2231, which is stored in or accessible by UE 2230 and executable by processing circuitry 2238. Software 2231 includes client application 2232. Client application 2232 may be operable to provide a service to a human or non-human user via UE 2230, with the support of host computer 2210. In host computer 2210, an executing host application 2212 may communicate with the executing client application 2232 via OTT connection 2250 terminating at UE 2230 and host computer 2210. In providing the service to the user, client application 2232 may receive request data from host application 2212 and provide user data in response to the request data. OTT connection 2250 may transfer both the request data and the user data. Client application 2232 may interact with the user to generate the user data that it provides.

It is noted that host computer 2210, base station 2220 and UE 2230 illustrated in FIG. 22 may be similar or identical to host computer 2130, one of base stations 2112a, 2112b, 2112c and one of UEs 2191, 2192 of FIG. 21, respectively. This is to say, the inner workings of these entities may be as shown in FIG. 22 and independently, the surrounding network topology may be that of FIG. 21.

In FIG. 22, OTT connection 2250 has been drawn abstractly to illustrate the communication between host computer 2210 and UE 2230 via base station 2220, without explicit reference to any intermediary devices and the precise routing of messages via these devices. Network infrastructure may determine the routing, which it may be configured to hide from UE 2230 or from the service provider operating host computer 2210, or both. While OTT connection 2250 is active, the network infrastructure may further take decisions by which it dynamically changes the routing (e.g., on the basis of load balancing consideration or reconfiguration of the network).

Wireless connection 2270 between UE 2230 and base station 2220 is in accordance with the teachings of the embodiments described throughout this disclosure. One or more of the various embodiments improve the performance of OTT services provided to UE 2230 using OTT connection 2250, in which wireless connection 2270 forms the last segment.

A measurement procedure may be provided for the purpose of monitoring data rate, latency and other factors on which the one or more embodiments improve. There may further be an optional network functionality for reconfiguring OTT connection 2250 between host computer 2210 and UE 2230, in response to variations in the measurement results. The measurement procedure and/or the network functionality for reconfiguring OTT connection 2250 may be implemented in software 2211 and hardware 2215 of host computer 2210 or in software 2231 and hardware 2235 of UE 2230, or both. In embodiments, sensors (not shown) may be deployed in or in association with communication devices through which OTT connection 2250 passes; the sensors may participate in the measurement procedure by supplying values of the monitored quantities exemplified above, or supplying values of other physical quantities from which software 2211, 2231 may compute or estimate the monitored quantities. The reconfiguring of OTT connection 2250 may include message format, retransmission settings, preferred routing etc.; the reconfiguring need not affect base station 2220, and it may be unknown or imperceptible to base station 2220. Such procedures and functionalities may be known and practiced in the art. In certain embodiments, measurements may involve proprietary UE signaling facilitating host computer 2210's measurements of throughput, propagation times, latency and the like. The measurements may be implemented in that software 2211 and 2231 causes messages to be transmitted, in particular empty or 'dummy' messages, using OTT connection 2250 while it monitors propagation times, errors etc.

Figure 23:
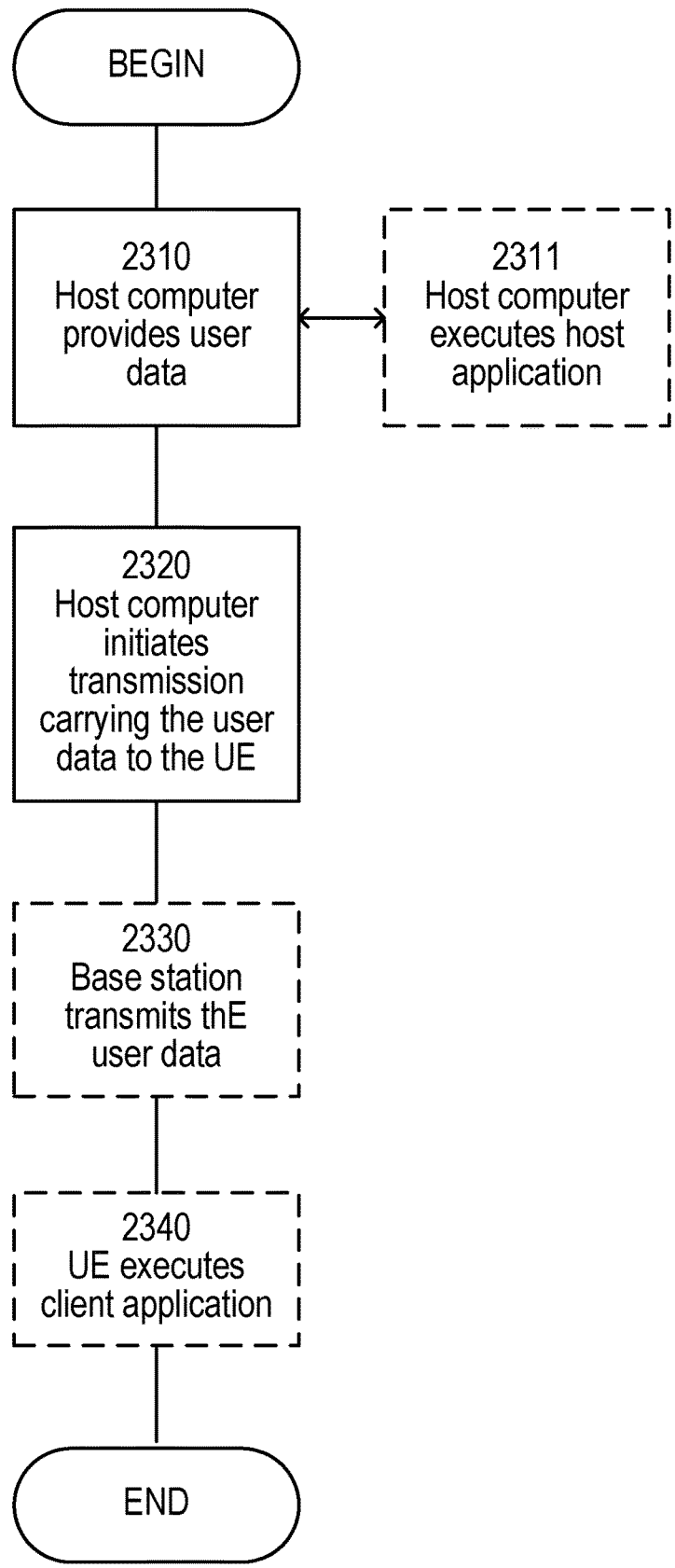
FIG. 23 illustrates methods implemented in a communication system including a host computer, a base station and a user equipment in accordance with some embodiments.

FIG. 23 illustrates methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 23 will be included in this section. In step 2310, the host computer provides user data. In substep 2311 (which may be optional) of step 2310, the host computer provides the user data by executing a host application. In step 2320, the host computer initiates a transmission carrying the user data to the UE. In step 2330 (which may be optional), the base station transmits to the UE the user data which was carried in the transmission that the host computer initiated, in accordance with the teachings of the embodiments described throughout this disclosure. In step 2340 (which may also be optional), the UE executes a client application associated with the host application executed by the host computer.

Figure 24:
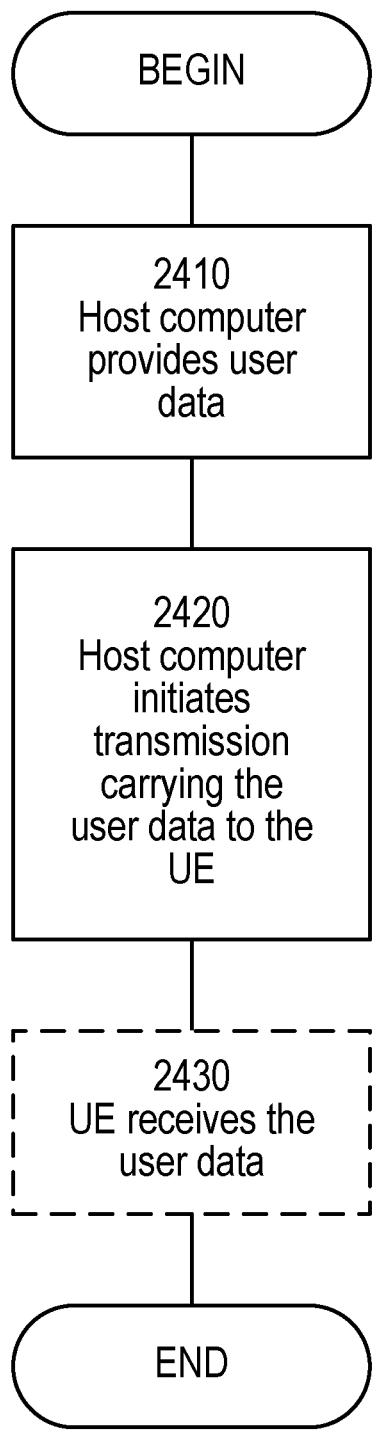
FIG. 24 illustrates methods implemented in a communication system including a host computer, a base station and a user equipment in accordance with some embodiments.

FIG. 24 illustrates methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 24 will be included in this section. In step 2410 of the method, the host computer provides user data. In an optional substep (not shown) the host computer provides the user data by executing a host application. In step 2420, the host computer initiates a transmission carrying the user data to the UE. The transmission may pass via the base station, in accordance with the teachings of the embodiments described throughout this disclosure. In step 2430 (which may be optional), the UE receives the user data carried in the transmission.

Figure 25:
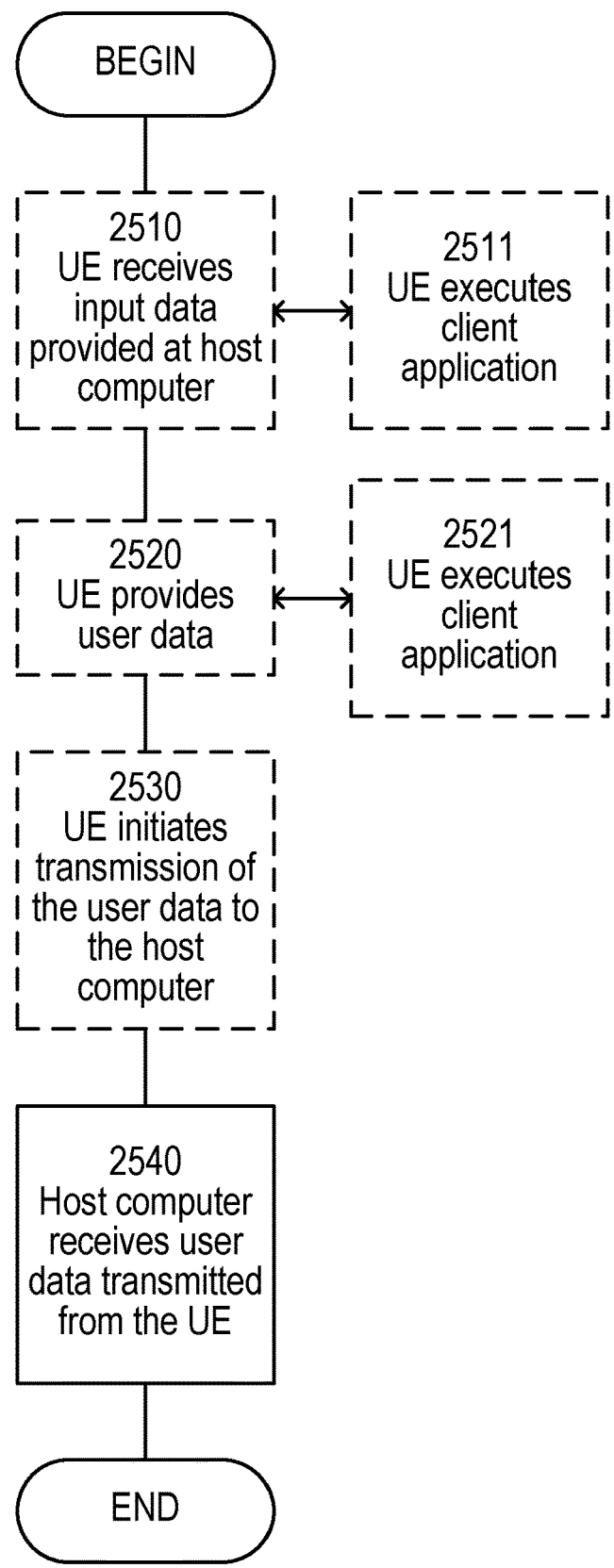
FIG. 25 illustrates methods implemented in a communication system including a host computer, a base station and a user equipment in accordance with some embodiments.

FIG. 25 illustrates methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 25 will be included in this section. In step 2510 (which may be optional), the UE receives input data provided by the host computer. Additionally or alternatively, in step 2520, the UE provides user data. In substep 2521 (which may be optional) of step 2520, the UE provides the user data by executing a client application. In substep 2511 (which may be optional) of step 2510, the UE executes a client application which provides the user data in reaction to the received input data provided by the host computer. In providing the user data, the executed client application may further consider user input received from the user. Regardless of the specific manner in which the user data was provided, the UE initiates, in substep 2530 (which may be optional), transmission of the user data to the host computer. In step 2540 of the method, the host computer receives the user data transmitted from the UE, in accordance with the teachings of the embodiments described throughout this disclosure.

Figure 26:
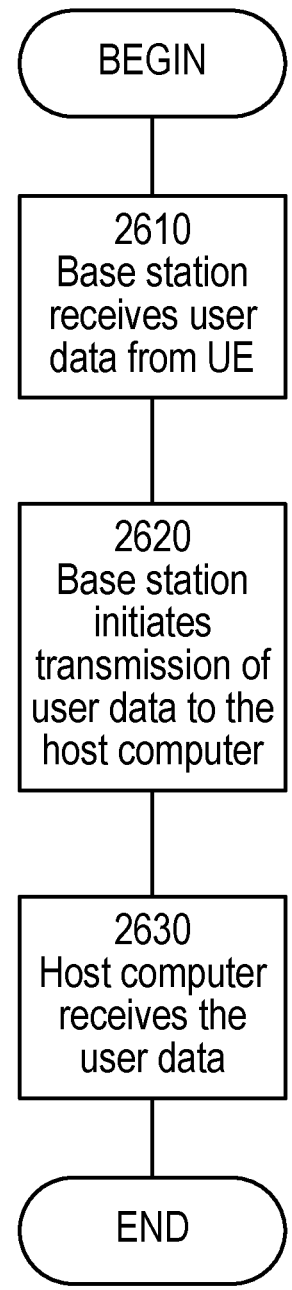
FIG. 26 illustrates methods implemented in a communication system including a host computer, a base station and a user equipment in accordance with some embodiments.

FIG. 26 illustrates methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 21 and 22. For simplicity of the present disclosure, only drawing references to FIG. 26 will be included in this section. In step 2610 (which may be optional), in accordance with the teachings of the embodiments described throughout this disclosure, the base station receives user data from the UE. In step 2620 (which may be optional), the base station initiates transmission of the received user data to the host computer. In step 2630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a wireless device for radio alignment estimation, the method comprising:
   transmitting an uplink reference signal to a network node, the uplink reference signal associated with time synchronization information; and
   receiving a downlink reference signal from the network node, the downlink reference signal associated with time synchronization information.
2. The method of embodiment 1, further comprising the step of estimating a channel associated with the downlink reference signal.
3. The method of embodiment 2, further comprising transmitting the channel estimate and time synchronization information associated with the downlink reference signal to the network node.
4. The method of embodiment 2, further comprising transmitting the channel estimate and time synchronization information associated with the downlink reference signal to another network node.
5. The method of embodiment 2, further comprising:
   receiving a channel estimate associated with the uplink reference signal from the network node;
   determining if the time synchronization information associated with the received uplink channel estimate correlates to the time synchronization information associated with the downlink reference signal; and comparing the received uplink channel estimate and the estimated downlink channel to determine whether the two channels are in alignment.

6. The method of any one of embodiments 1-5, wherein the uplink reference signal comprises one of an SRS and a DM-RS.

7. The method of any one of embodiments 1-6, wherein the downlink reference signal comprises one of a DM-RS and a CSI-RS.

8. The method of any of the previous embodiments, further comprising:
providing user data; and
forwarding the user data to a host computer via the transmission to the base station.

Group B Embodiments

9. A method performed by a base station for radio alignment estimation, the method comprising:
transmitting a downlink reference signal to a wireless device, the downlink reference signal associated with time synchronization information; and
receiving an uplink reference signal from the wireless device, the uplink reference signal associated with time synchronization information.

10. The method of embodiment 9, further comprising the step of estimating a channel associated with the uplink reference signal.

11. The method of embodiment 10, further comprising transmitting the channel estimate and time synchronization information associated with the uplink reference signal to the wireless device.

12. The method of embodiment 10, further comprising transmitting the channel estimate and time synchronization information associated with the uplink reference signal to another network node.

13. The method of embodiment 10, further comprising:
receiving a channel estimate associated with the downlink reference signal from wireless device;
determining the time synchronization information associated with the received downlink channel estimate correlates to the time synchronization information associated with the uplink reference signal; and
comparing the received downlink channel estimate and the estimated uplink channel to determine whether the two channels are in alignment.

14. The method of any one of embodiments 9-13, wherein the uplink reference signal comprises one of an SRS and a DM-RS.

15. The method of any one of embodiments 9-14, wherein the downlink reference signal comprises one of a DM-RS and a CSI-RS.

16. The method of any of the previous embodiments, further comprising:
obtaining user data; and
forwarding the user data to a host computer or a wireless device.

Group C Embodiments

17. A wireless device for radio alignment estimation, the wireless device comprising:
processing circuitry configured to perform any of the steps of any of the Group A embodiments; and
power supply circuitry configured to supply power to the wireless device.

18. A base station for radio alignment estimation, the base station comprising:
processing circuitry configured to perform any of the steps of any of the Group B embodiments;
power supply circuitry configured to supply power to the wireless device.

19. A user equipment (UE) for radio alignment estimation, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

20. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

21. The communication system of the pervious embodiment further including the base station.

22. The communication system of the previous 2 embodiments, further including the UE, wherein the UE is configured to communicate with the base station.

23. The communication system of the previous 3 embodiments, wherein:
the processing circuitry of the host computer is configured to execute a host application, thereby providing the user data; and
the UE comprises processing circuitry configured to execute a client application associated with the host application.

24. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

25. The method of the previous embodiment, further comprising, at the base station, transmitting the user data.

26. The method of the previous 2 embodiments, wherein the user data is provided at the host computer by executing a host application, the method further comprising, at the UE, executing a client application associated with the host application.

27. A user equipment (UE) configured to communicate with a base station, the UE comprising a radio interface and processing circuitry configured to performs any of the previous 3 embodiments.

28. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

29. The communication system of the previous embodiment, wherein the cellular network further includes a base station configured to communicate with the UE.

30. The communication system of the previous 2 embodiments, wherein:
the processing circuitry of the host computer is configured to execute a host application, thereby providing the user data; and
the UE's processing circuitry is configured to execute a client application associated with the host application.

31. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

32. The method of the previous embodiment, further comprising at the UE, receiving the user data from the base station.

33. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

34. The communication system of the previous embodiment, further including the UE.

35. The communication system of the previous 2 embodiments, further including the base station, wherein the base station comprises a radio interface configured to communicate with the UE and a communication interface configured to forward to the host computer the user data carried by a transmission from the UE to the base station.

36. The communication system of the previous 3 embodiments, wherein:
the processing circuitry of the host computer is configured to execute a host application; and
the UE's processing circuitry is configured to execute a client application associated with the host application, thereby providing the user data.

37. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

38. A method implemented in a communication system including a host computer, a base station and a user equipment (UE), the method comprising:
at the host computer, receiving user data transmitted to the base station from the UE, wherein the UE performs any of the steps of any of the Group A embodiments.

39. The method of the previous embodiment, further comprising, at the UE, providing the user data to the base station.

40. The method of the previous 2 embodiments, further comprising:
at the UE, executing a client application, thereby providing the user data to be transmitted; and
at the host computer, executing a host application associated with the client application.

41. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

42. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

43. The communication system of the previous embodiment further including the base station.

44. The communication system of the previous 2 embodiments, further including the UE, wherein the UE is configured to communicate with the base station.

45. The communication system of the previous 3 embodiments, wherein:
the processing circuitry of the host computer is configured to execute a host application;
the UE is configured to execute a client application associated with the host application, thereby providing the user data to be received by the host computer.

46. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

47. The method of the previous embodiment, further comprising at the base station, receiving the user data from the UE.

48. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DM-RS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a network node for determining radio alignment of a full downlink channel and a full uplink channel between a wireless device and a multi-antenna base station comprising a plurality of antennas, the method comprising:
   obtaining downlink channel data, wherein the downlink channel data comprises:
      estimates of a plurality of downlink channels each associated with a downlink reference signal being received from one of the plurality of antennas at the wireless device, and time synchronization information associated with each of the plurality of downlink channels,
         wherein the estimates of the plurality of downlink channels comprises estimates of a plurality of subset vector channels each associated with a different time instance, $m_i$, and estimates of a phase tracking channel at each different time instance, $m_i$, and
         wherein the phase tracking channel is associated with a first downlink reference signal always transmitted from a first antenna of the plurality of antennas, and the plurality of subset vector channels is associated with a plurality of cycled downlink reference signals cycled over the plurality of antennas excluding the first antenna over consecutive downlink slots, the plurality of cycled downlink reference signals being fewer than the plurality of antennas excluding the first antenna;
   obtaining uplink channel data, wherein the uplink channel data comprises:
      estimates of a plurality of uplink channels each associated with an uplink reference signal being received one of the plurality of antennas from the wireless device, and time synchronization information associated with each of the plurality of uplink channels; and
   comparing the downlink channel data and the uplink channel data to determine whether the downlink channel and uplink channel between the wireless device and the multi-antenna base station are aligned.

2. The method as claimed in claim 1 further comprising:
   selecting a first time instance, $m_1$;
   for each of the plurality of subset vector channels associated with time instance $m_i$
      determining a phase difference between the phase tracking channel at $m_i$ and the phase tracking channel at $m_1$; and
      de-rotating the subset vector channel by the phase difference to provide an estimate of the subset vector channel at time instance $m_i$; and
   stacking the estimates of the plurality of subset vector channels at time instance $m_i$ on top of the estimate of the phase tracking channel at time instance $m_i$ to determine an estimate of a full downlink vector channel at time instance $m_2$.

3. The method as claimed in claim 2 wherein the estimates of the plurality of uplink channels comprises an estimate of a full uplink vector channel at different time instances, $m_k$, wherein the step of comparing the downlink channel data and the uplink channel data comprises:
   comparing the estimate of the full downlink vector channel at time instance $m_2$ with the estimate of the full uplink vector channel at time instance $m_2$.

4. The method as claimed in claim 1, wherein the method is performed by the wireless device.

5. The method as claimed in claim 1, wherein the method is performed by the multi-antenna base station.

6. A method performed by a wireless device in communication with a multi-antenna base station comprising a plurality of antennas for radio alignment of downlink channels and uplink channels between the wireless device and the multi-antenna base station, the method comprising:
   transmitting uplink reference signals from an antenna in the wireless device to the multi-antenna base station, wherein the uplink reference signals are transmitted across multiple time instances;
   receiving downlink reference signals from the multi-antenna base station wherein the downlink reference signals are received over multiple time instances; and
   determining downlink channel data, wherein the downlink channel data comprises:
      estimates of a plurality of downlink channels associated with each of the downlink reference signals, and time synchronization information associated with each of the plurality of downlink channels,
   wherein the estimates of the plurality of downlink channels comprises estimates of a plurality of subset vector channels each associated with a different time instance and estimates of a phase tracking channel at each different time instance, and
   wherein the phase tracking channel is associated with a first downlink reference signal always transmitted from a first antenna of the plurality of antennas, and the plurality of subset vector channels is associated with a plurality of cycled downlink reference signals cycled over the plurality of antennas excluding the first antenna over consecutive downlink slots, the plurality of cycled downlink reference signals being fewer than the plurality of antennas excluding the first antenna.

7. The method as claimed in claim 6 further comprising obtaining the time synchronization information by time stamping each of the plurality of downlink channels upon reception of the respective downlink reference signals.

8. The method as claimed in claim 6 further comprising obtaining the time synchronisation information by receiving a time stamp associated with each of the downlink reference signals.

9. The method of claim 6 further comprising transmitting the downlink channel data to the multi-antenna base station.

10. The method of claim 6 further comprising transmitting the downlink channel data to a network node.

11. A wireless device in communication with a multi-antenna base station comprising a plurality of antennas for radio alignment of downlink channels and uplink channels between the wireless device and the multi-antenna base station, the wireless device comprising processing circuitry to:
   transmit uplink reference signals from an antenna in the wireless device to the multi-antenna base station, wherein the uplink reference signals are transmitted across multiple time instances;
   receive downlink reference signals from the multi-antenna base station wherein the downlink reference signals are received over multiple time instances; and
   determine downlink channel data, wherein the downlink channel data comprises:
      estimates of a plurality of downlink channels associated with each of the downlink reference signals, and time synchronization information associated with each of the plurality of downlink channels,
   wherein the estimates of the plurality of downlink channels comprises estimates of a plurality of subset vector channels each associated with a different time instance and estimates of a phase tracking channel at each different time instance, and wherein the phase tracking channel is associated with a first downlink reference signal always transmitted from a first antenna of the plurality of antennas, and the plurality of subset vector channels is associated with a plurality of cycled downlink reference signals cycled over the plurality of antennas excluding the first antenna over consecutive downlink slots, the plurality of cycled downlink reference signals being fewer than the plurality of antennas excluding the first antenna.

12. A network node for determining radio alignment of a full downlink channel and a full uplink channel between a wireless device and a multi-antenna base station comprising a plurality of antennas, the network node comprising processing circuitry to:

obtain downlink channel data, wherein the downlink channel data comprises:

estimates of a plurality of downlink channels each associated with a downlink reference signal being received from one of the plurality of antennas at the wireless device, and time synchronization information associated with each of the plurality of downlink channels, wherein the estimates of the plurality of downlink channels comprises estimates of a plurality of subset vector channels each associated with a different time instance, $m_i$, and estimates of a phase tracking channel at each different time instance, $m_i$, and wherein the phase tracking channel is associated with a first downlink reference signal always transmitted from a first antenna of the plurality of antennas, and the plurality of subset vector channels is associated with a plurality of cycled downlink reference signals cycled over the plurality of antennas excluding the first antenna over consecutive downlink slots, the plurality of cycled downlink reference signals being fewer than the plurality of antennas excluding the first antenna;

obtain uplink channel data, wherein the uplink channel data comprises:

estimates of a plurality of uplink channels each associated with an uplink reference signal being received one of the plurality of antennas from the wireless device, and time synchronization information associated with each of the plurality of uplink channels; and compare the downlink channel data and the uplink channel data to determine whether the downlink channel and uplink channel between the wireless device and the multi-antenna base station are aligned.

13. The wireless device as claimed in claim 11 further to obtain the time synchronization information by time stamping each of the plurality of downlink channels upon reception of the respective downlink reference signals.

14. The wireless device as claimed in claim 11 further to obtain the time synchronisation information by receiving a time stamp associated with each of the downlink reference signals.

15. The network node as claimed in claim 12 further comprising:

select a first time instance, $m_1$;

for each of the plurality of subset vector channels associated with time instance $m_i$ determine a phase difference between the phase tracking channel at $m_i$ and the phase tracking channel at $m_1$; and de-rotate the subset vector channel by the phase difference to provide an estimate of the subset vector channel at time instance $m_i$; and stack the estimates of the plurality of subset vector channels at time instance $m_i$ on top of the estimate of the phase tracking channel at time instance $m_i$ to determine an estimate of a full downlink vector channel at time instance $m_2$.

16. The network node as claimed in claim 15, wherein the estimates of the plurality of uplink channels comprises an estimate of a full uplink vector channel at different time instances, $m_k$, wherein when comparing the downlink channel data and the uplink channel data comprises:

compare the estimate of the full downlink vector channel at time instance $m_2$ with the estimate of the full uplink vector channel at time instance $m_2$.

* * * * *